(12) United States Patent
Kanamaru

(10) Patent No.: US 10,770,037 B2
(45) Date of Patent: Sep. 8, 2020

(54) MOBILE TERMINAL DEVICE

(71) Applicant: KYOCERA Document Solutions Inc., Osaka (JP)

(72) Inventor: Kazuhiro Kanamaru, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/295,314

(22) Filed: Mar. 7, 2019

(65) Prior Publication Data

US 2019/0287492 A1 Sep. 19, 2019

(30) Foreign Application Priority Data

Mar. 15, 2018 (JP) .................................. 2018-048596
Mar. 15, 2018 (JP) .................................. 2018-048597
Mar. 15, 2018 (JP) .................................. 2018-048598

(51) Int. Cl.
  *G06F 3/038* (2013.01)
  *G06F 3/048* (2013.01)
  (Continued)

(52) U.S. Cl.
  CPC .............. *G09G 5/38* (2013.01); *G06F 1/1626* (2013.01); *G06F 1/1694* (2013.01);
  (Continued)

(58) Field of Classification Search
  CPC .......... G09G 5/38; G06F 1/1626–1694; G06F 3/0346–04886; B60K 35/00
  See application file for complete search history.

(56) References Cited

U.S. PATENT DOCUMENTS 8,769,431 B1 * 7/2014 Prasad ................... G06F 3/048
                                              715/788
2010/0241985 A1 * 9/2010 Kim ................... G06F 3/04886
                                              715/773
(Continued)

FOREIGN PATENT DOCUMENTS

EP        2637086 A1    9/2013
WO    2013035229 A1    3/2013

OTHER PUBLICATIONS

Extended European Search Report dated Nov. 7, 2019 mailed in the corresponding European Patent Application No. 19161720.8.

*Primary Examiner* — Lin Li
(74) *Attorney, Agent, or Firm* — IP Business Solutions, LLC

(57) ABSTRACT

A mobile terminal device includes: a housing; a touch panel-equipped display section; a sensor; and a control unit including a processor and, upon execution of a control program by the processor, functioning as a display control section, an operating region decision section, an operating region storage section, a specific inclination determination section, and a display change section. The operating region decision section determines, during holding of the housing with a user's one hand, an operating region on the screen of the display section reachable with an operating finger of the one hand from a trace of points of touch with the operating finger. When an inclination of the housing detected by the sensor is determined to be a specific inclination toward the operating finger by the specific inclination determination section, the display change section moves and displays a plurality of on-screen objects into and within the operating region.

5 Claims, 22 Drawing Sheets

(51) Int. Cl.
  *H04M 1/72*    (2006.01)
  *G09G 5/38*    (2006.01)
  *G06F 3/0346*    (2013.01)
  *G06F 3/0488*    (2013.01)
  *G06F 1/16*    (2006.01)
  *G06F 3/0482*    (2013.01)

(52) U.S. Cl.
  CPC .......... *G06F 3/0346* (2013.01); *G06F 3/0482* (2013.01); *G06F 3/04883* (2013.01); *G06F 3/04886* (2013.01); *G09G 2340/0464* (2013.01); *G09G 2354/00* (2013.01)

(56) References Cited

U.S. PATENT DOCUMENTS

| | | | |
|---|---|---|---|
| 2012/0054643 A1* | 3/2012 | Yamane | G06Q 10/107 715/753 |
| 2013/0111403 A1* | 5/2013 | Nakamura | B60K 35/00 715/810 |
| 2013/0237288 A1 | 9/2013 | Lee | |
| 2013/0307801 A1* | 11/2013 | Nam | H04M 1/72563 345/173 |
| 2014/0028604 A1* | 1/2014 | Morinaga | G06F 3/04886 345/173 |
| 2014/0157119 A1* | 6/2014 | Lim | G06F 40/169 715/256 |
| 2014/0204063 A1 | 7/2014 | Kaida | |
| 2015/0084885 A1* | 3/2015 | Kawamoto | G06F 3/038 345/173 |
| 2016/0077551 A1 | 3/2016 | Fujino et al. | |
| 2016/0188189 A1 | 6/2016 | Chu | |
| 2016/0253076 A1 | 9/2016 | Lee | |

\* cited by examiner

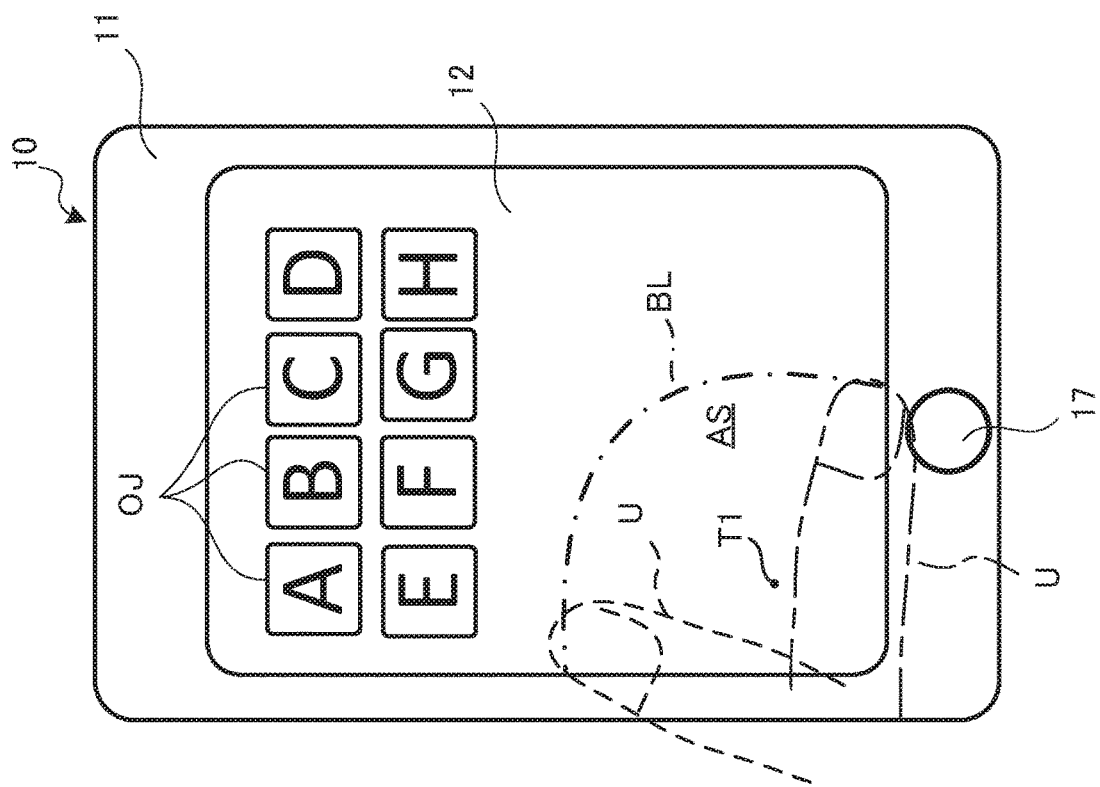
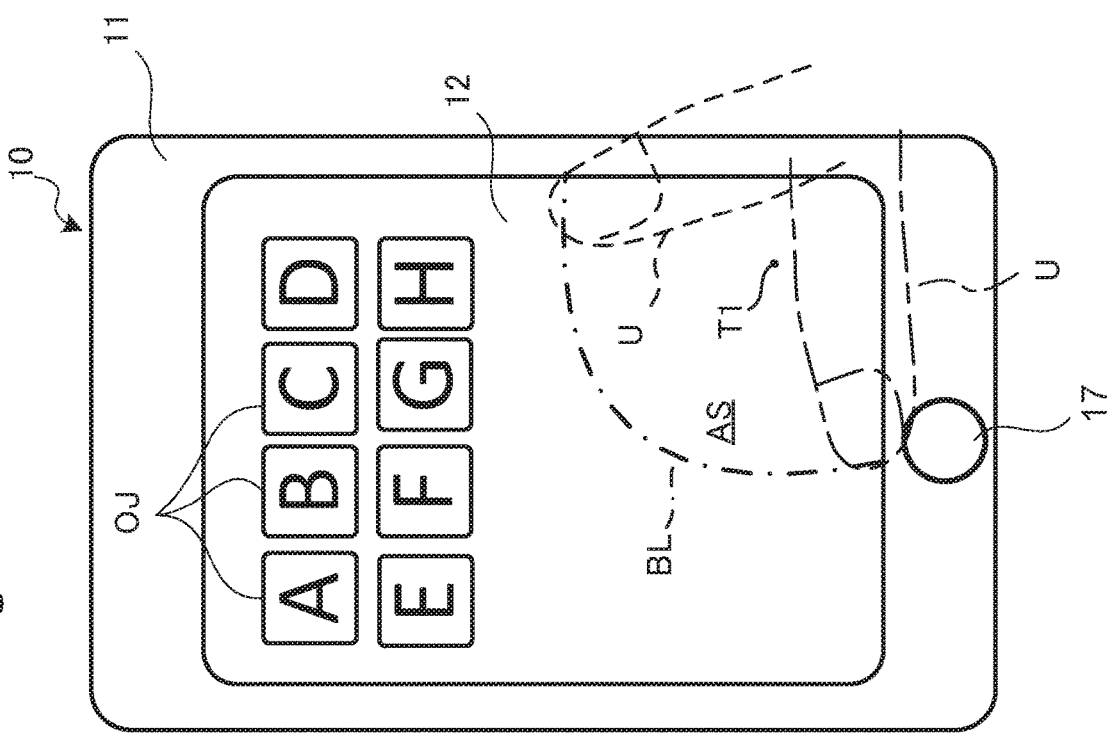

Fig.9A
LATERAL INCLINATION
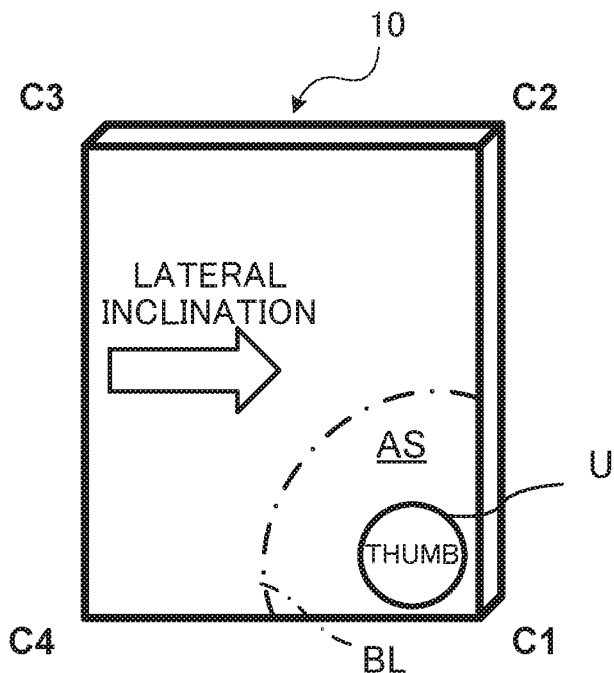
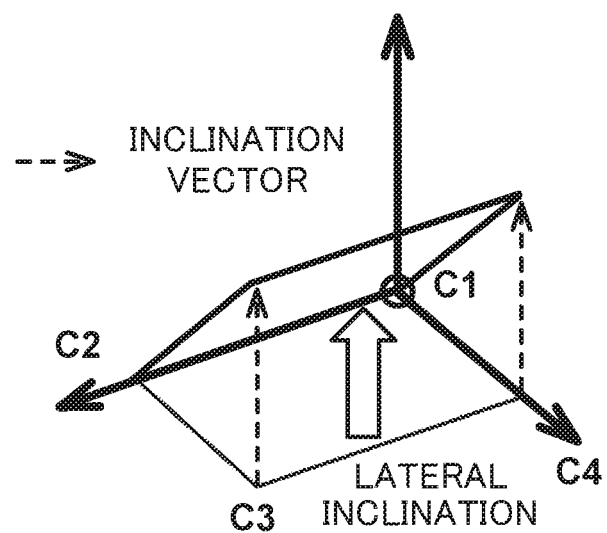

Fig.9B
DIAGONAL INCLINATION
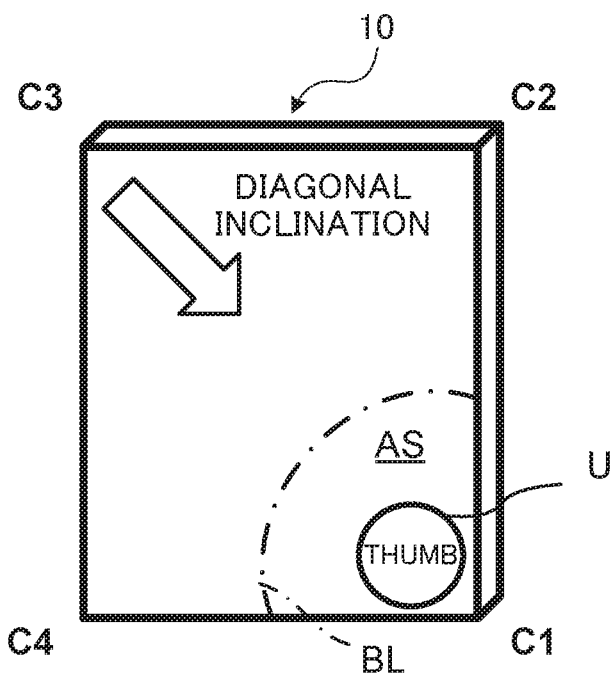
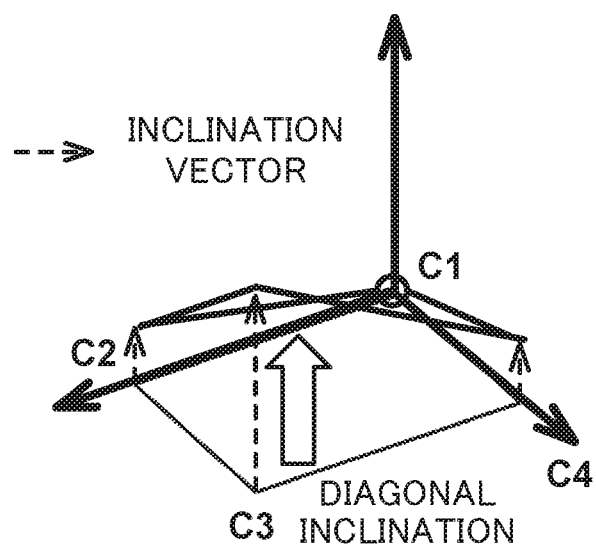

Fig.9C
FORE-AND-AFT INCLINATION
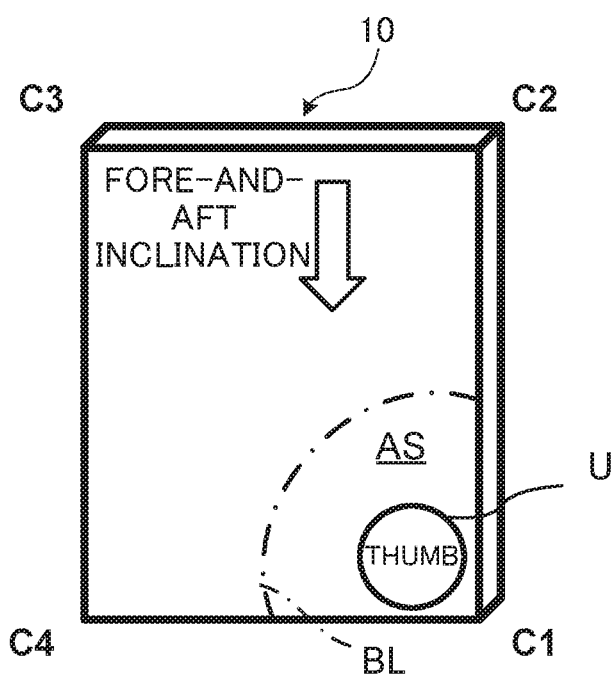
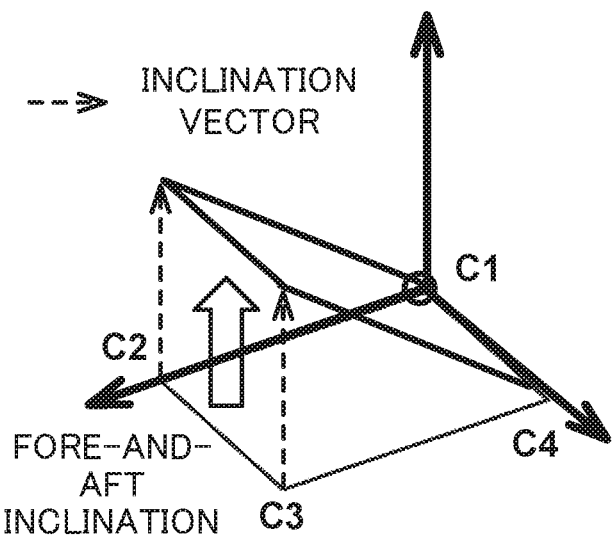

Fig.10A
LATERAL INCLINATION
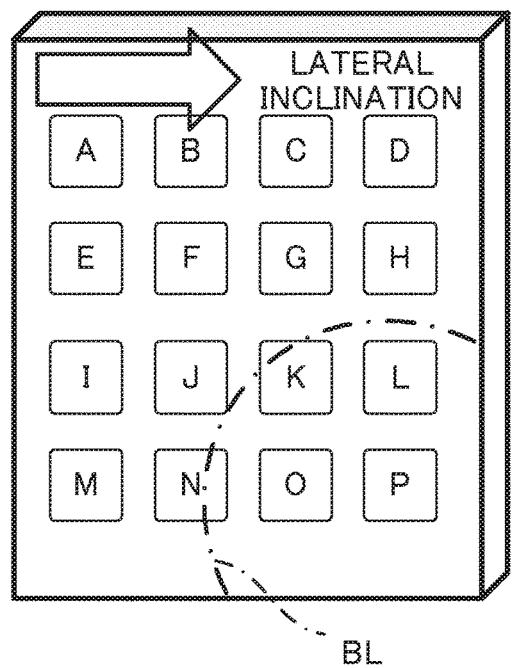
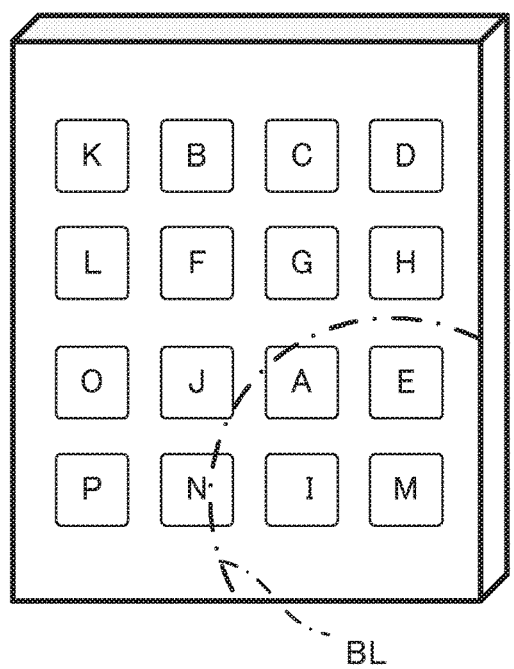

Fig.10B
DIAGONAL INCLINATION
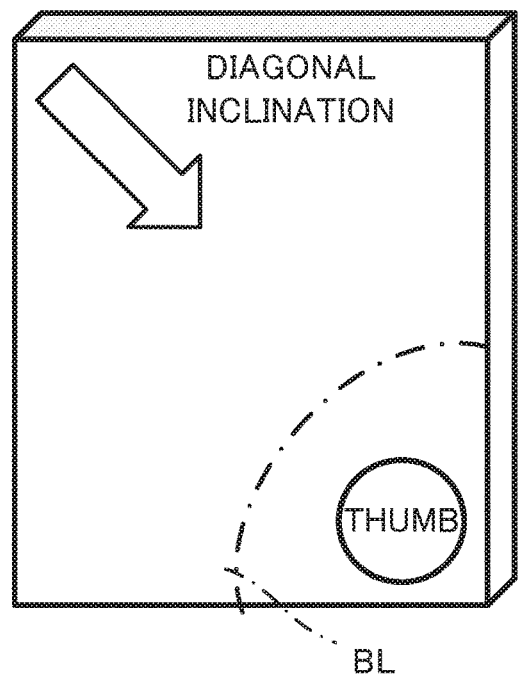
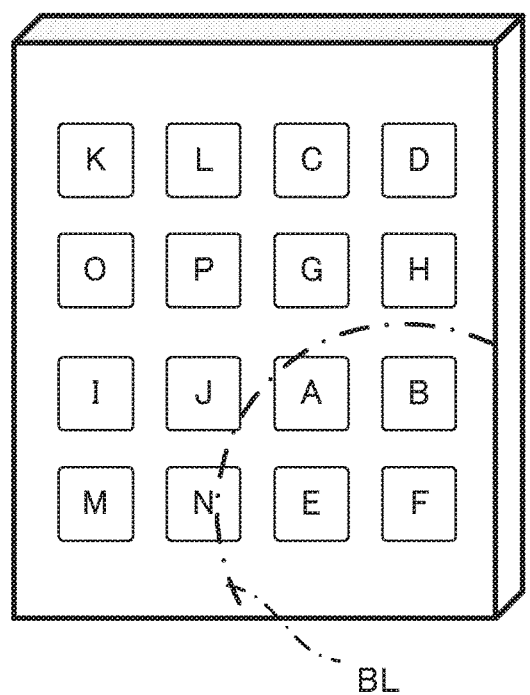

Fig. 10C
FORE-AND-AFT INCLINATION
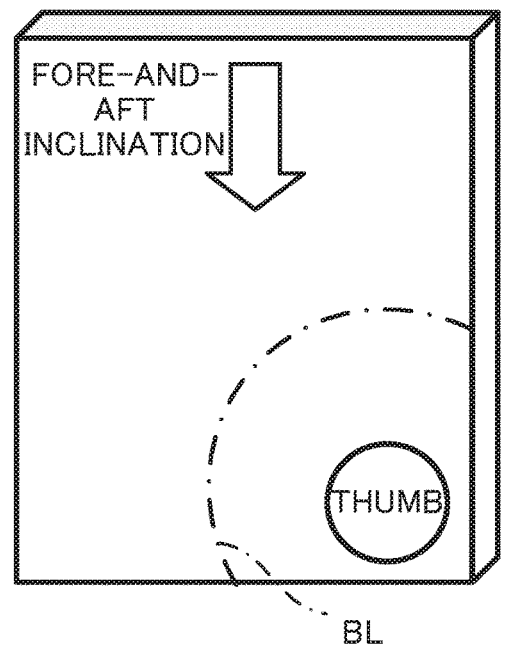
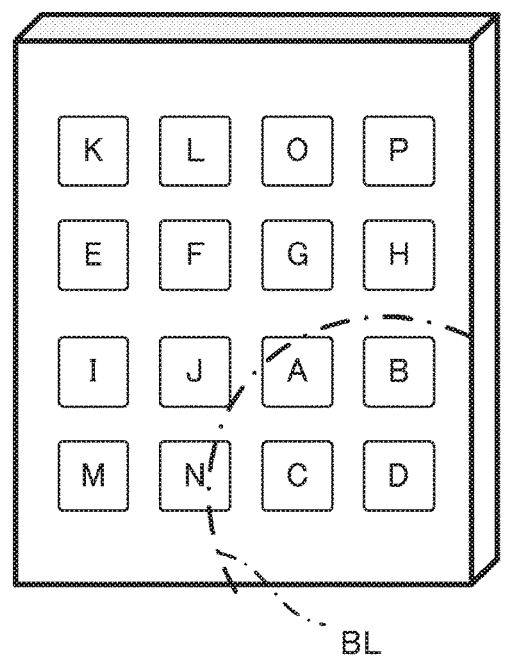

Fig.13A SPECIFIC INCLINATION
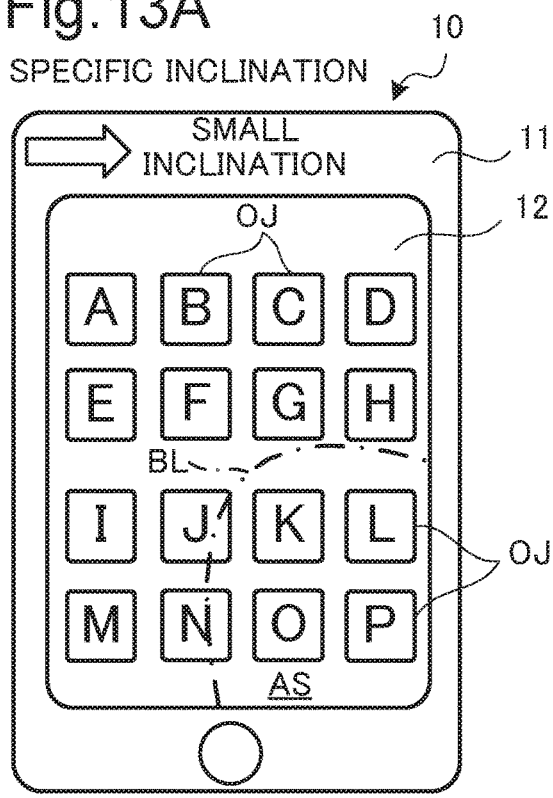
Fig.13B FORMATION OF BLANK REGION
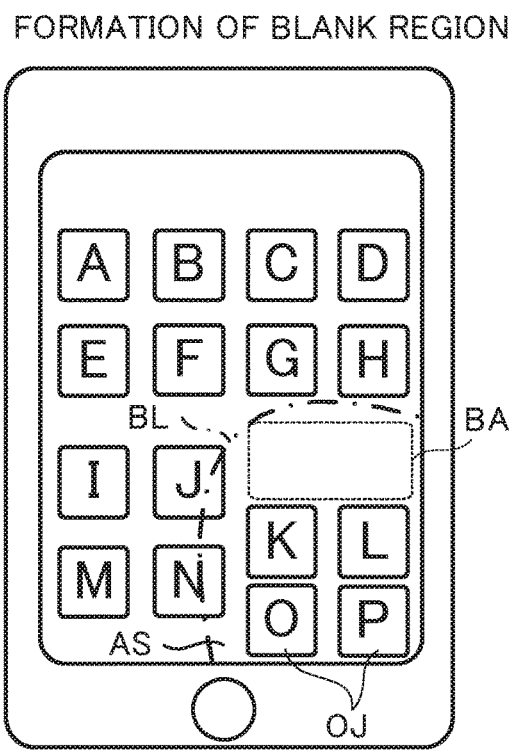
Fig.13C DISPLAY OF LEADING LINES
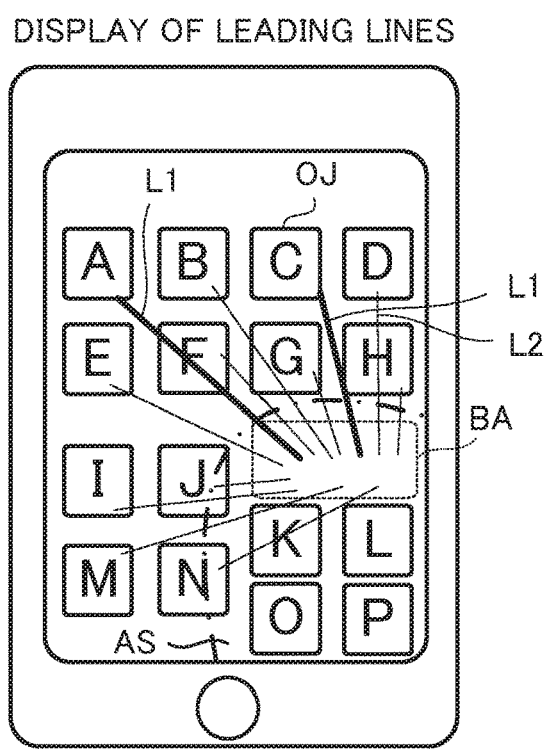
Fig.13D MOVEMENT OF OBJECT INTO OPERATING REGION
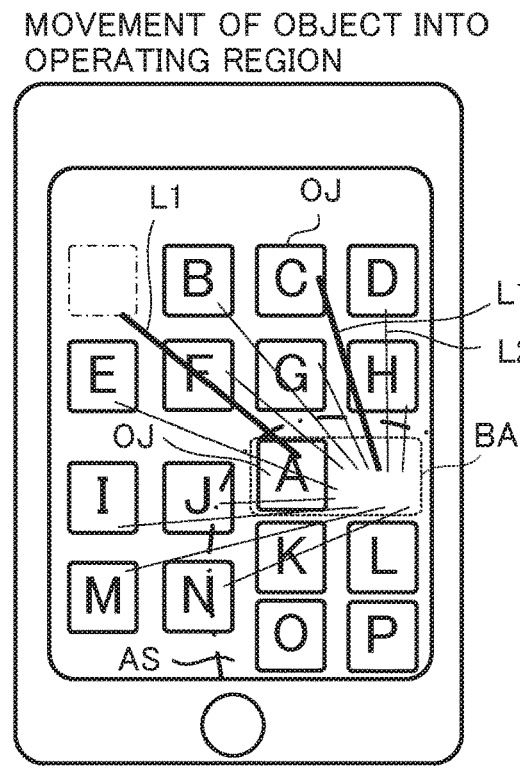

SPECIFIC INCLINATION

TOUCH GESTURE OF CUTTING LEADING LINE

RETURN OF DRAGGED OBJECT

MOVEMENT OF OBJECT HAVING LOW FREQUENCY OF USE

MOBILE TERMINAL DEVICE

INCORPORATION BY REFERENCE

This application claims priority to Japanese Patent Applications No. 2018-048596, No. 2018-048597, and No. 2018-048598 filed on Mar. 15, 2018, the entire contents of which are incorporated by reference herein.

BACKGROUND

The present disclosure relates to mobile terminal devices and methods for controlling the display of mobile terminal devices and particularly relates to a technique for improving the operability of a mobile terminal device with one hand.

In operating a mobile terminal device having a relatively large screen with a user's one hand, the fingers of the one hand often do not reach objects, such as buttons, located at ends of the screen. In such a case, touch gestures must be made on these buttons with the other hand, which gives inconvenience to the user against his/her desire to operate the mobile terminal device with one hand. For example, there is a technique in which when a user is operating a mobile terminal device with one hand, the grip force of the one hand applied to the housing of the mobile terminal device is detected and, if the detected value of the grip force is beyond a threshold, the display of the mobile terminal device is controlled to bring buttons unreachable with a user's operating finger close to the finger.

SUMMARY

A technique improved over the aforementioned technique is proposed as one aspect of the present disclosure.

A mobile terminal device according to an aspect of the present disclosure includes a housing, a display section, a touch panel, a sensor, and a control unit. The display section is housed in the housing. The touch panel is disposed on a screen of the display section. The sensor detects an inclination of the housing. The control unit includes a processor and, upon execution of a control program by the processor, functions as a display control section, an operating region decision section, an operating region storage section, a specific inclination determination section, and a display change section. The display control section allows the display section to display, at a plurality of predetermined placement locations on the screen, a plurality of objects selectable by a user's touch gesture. The operating region decision section determines, during holding of the housing with a user's one hand, an operating region on the screen of the display section reachable with an operating finger of the one hand from a trace of points of touch on the screen of the display section with the operating finger. The operating region storage section stores region data indicating the operating region determined by the operating region decision section. The specific inclination determination section determines, after storage of the region data in the operating region storage section, whether or not the inclination of the housing detected by the sensor is a specific inclination toward the operating finger of the one hand. Upon determination of the specific inclination by the specific inclination determination section, the display change section sets a plurality of changed placement locations within the operating region, moves the plurality of objects to the set plurality of changed placement locations, respectively, and displays the plurality of objects at the plurality of changed placement locations, respectively.

A method for controlling display of a mobile terminal device according to another aspect of the present disclosure is a method for controlling display of a mobile terminal device including a housing, a display section housed in the housing, and a touch panel disposed on a screen of the display section and includes a display control step, an operating region decision step, an operating region storage step, a specific inclination determination step, and a display change step. The display control step is the step of allowing the display section to display, at a plurality of predetermined placement locations on the screen, a plurality of objects selectable by a user's touch gesture. The operating region decision step is the step of determining, during holding of the housing with a user's one hand, an operating region on the screen of the display section reachable with an operating finger of the one hand from a trace of points of touch on the screen of the display section with the operating finger. The operating region storage step is the step of storing region data indicating the operating region determined in the operating region decision step. The specific inclination determination step is the step of determining, after storage of the region data in the operating region storage step, whether or not an inclination of the housing detected by a sensor is a specific inclination toward the operating finger of the one hand. The display change step is the step of, upon determination of the specific inclination in the specific inclination determination step, setting a plurality of changed placement locations within the operating region indicated by the region data stored in the operating region storage step, moving the plurality of objects to the plurality of changed placement locations, respectively, and displaying the plurality of objects at the plurality of changed placement locations, respectively.

BRIEF DESCRIPTION OF THE DRAWINGS

FIG. 3A is view showing an example where an operating region is determined by a gesture with the right hand.

FIG. 3B is view showing an example where an operating region is determined by a gesture with the left hand.

FIGS. 9A to 9C are views and diagrams for illustrating a lateral inclination, a diagonal inclination, and a fore-and-aft inclination as specific inclinations of the mobile terminal device.

FIGS. 10A to 10C are views showing that objects are moved within the operating region according to the lateral inclination, the diagonal inclination, and the fore-and-aft inclination, respectively, of the mobile terminal device.

FIGS. 13A to 13D are views showing examples of display screen images in the case of moving and displaying an object within the operating region in the second embodiment.

DETAILED DESCRIPTION

Hereinafter, a description will be given of a mobile terminal device according to a first embodiment of the present disclosure and a method for controlling the display of the mobile terminal device, with reference to the drawings.

Figure 1:
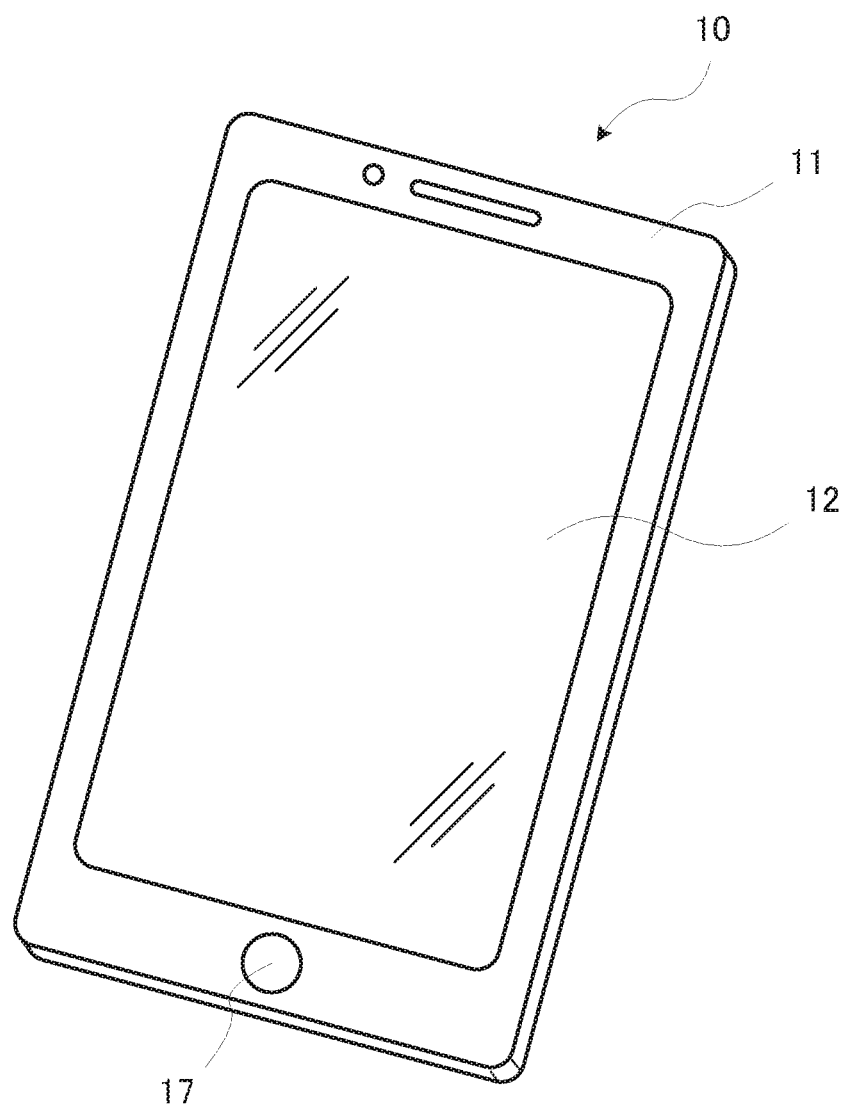
FIG. 1 is an external view of a mobile terminal device according to a first embodiment of the present disclosure.

FIG. 1 is an external view of a mobile terminal device 10 according to the first embodiment of the present disclosure. The mobile terminal device 10 is a terminal that includes a housing 11 having a vertically long rectangular, flat appearance configuration, a later-described display section 12 housed in the housing 11, and so on and has a size holdable in one hand. The mobile terminal device 10 is, for example, one having a height of about 140 mm, a width of about 70 mm, and a thickness of about 7 to 8 mm and commonly called a smartphone, but is not limited to such a smartphone.

A touch panel-equipped display section 12 is disposed on the front of the mobile terminal device 10 to cover substantially the entire front surface. Typically, the size of the screen of the display section 12 is about 5 to 6 inches but not limited to such a size. A terminal including a display section 12 having a large-sized screen with about 9 inches or more is commonly called a tablet terminal.

Figure 2:
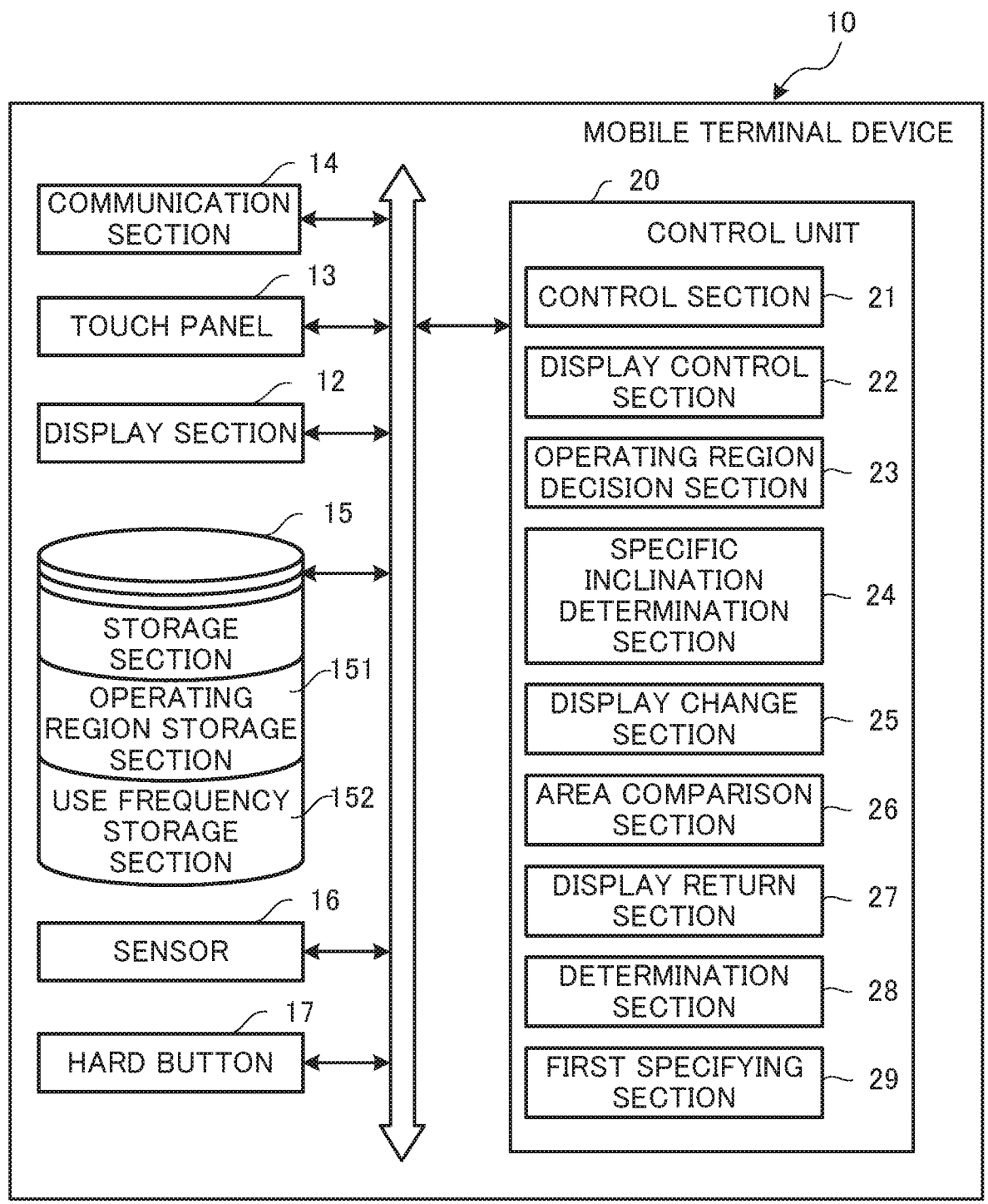
FIG. 2 is a block diagram showing the configuration of the mobile terminal device according to the first embodiment of the present disclosure.

FIG. 2 is a block diagram showing a schematic internal configuration of the mobile terminal device 10. The mobile terminal device 10 includes the display section 12, a touch panel 13, a communication section 14, a storage section 15, a sensor 16, a hard button 17, and a control unit 20. These components are capable of transferring data or signals to and from one another via a bus.

A camera, a speaker, LEDs, and so on are disposed on the exterior of the mobile terminal device 1, but these elements are not given in FIG. 1 for convenience sake.

The display section 12 is formed of a liquid crystal display (LCD), an organic EL (organic light-emitting diode (OLED)) display or the like.

The touch panel 13 is a touch panel of, for example, a so-called resistive film system or a capacitance system. The touch panel 13 is disposed on the screen of the display section 12 and is capable of detecting a touch on the screen of the display section 12 with a finger or the like, together with the point of touch. When detecting a touch with a finger or the like, the touch panel 13 outputs a detection signal indicating the coordinate of the point of touch to a control section 21 of the control unit 22 or the like. Therefore, the touch panel 13 serves as an operating section through which a user's operation made on the screen of the display section 12 is input. Thus, the display section 12 can display objects, including various buttons, at arbitrary placement locations on the screen and the touch panel 13 can detect on which button a touch gesture has been made.

The mobile terminal device 10 may also include, in addition to the above touch panel 13, hard keys as an operating section through which a user's operation is to be input.

The communication section 14 is a communication interface capable of wireless communications with wireless base stations and external devices. As a wireless communication system, Wi-Fi (registered trademark), Bluetooth (registered trademark) or other systems can be used. Furthermore, the communication section 14 can also perform carrier signal communications through 3G; LTF (long term evolution) or other systems.

The storage section 15 is formed of a large-storage SSD (solid state drive), HDD (hard disk drive) or the like and stores various types of data and programs. The storage section 15 can also store temporal data for use by the control unit 20 during execution of applications.

The sensor 16 detects the inclination of the housing 11 and is, for example, an acceleration sensor or a gyroscope sensor.

The control unit 20 is composed of a processor, a RAM (random access memory), a ROM (read only memory), and so on. The processor is, for example, a CPU (central processing unit), an MPU or an ASIC. When a control program stored in the above ROM or storage section 15 is executed by the above processor, the control unit 20 functions as a control section 21, a display control section 22, an operating region decision section 23, a specific inclination determination section 24, a display change section 25, an area comparison section 26, a display return section 27, a determination section 28, and a first specifying section 29. Alternatively, each of these components of the control unit 20 may not be implemented by the operation of the control unit 20 in accordance with the above control program but may be constituted by a hardware circuit. The control unit 20 (for example, the RAM and ROM of the control unit 20) may further function as an operating region storage section 151, a use frequency storage section 152, and a distance storage section 153 that will be each described hereinafter.

The control section 21 governs the overall operation control of the mobile terminal device 10. Furthermore, the control section 21 is connected to the display section 12, the touch panel 13, the communication section 14, the storage section 15, the sensor 16, and so on and performs operation control of these components and signal or data transfer to and from each of these components. The control section 21 executes, particularly, application programs (apps) installed on the mobile terminal device 10, controls the display of screen images on the display section 12, and operates according to a touch gesture on the screen of the display section 12. For example, when the control section 21 executes an app for remotely operating a multifunction peripheral, the copy, print, scan, and facsimile functions of the multifunction peripheral can be remotely controlled through a GUI (graphical user interface) displayed on the screen of the display section 12 of the mobile terminal device 10.

The display control section 22 allows the display section 12 to display, at a plurality of predetermined placement locations (for example, 2×4 matrix placement locations including two vertical and four horizontal placement locations in FIG. 3A) on the screen, a plurality of objects (eight objects OJ from "A" to "H") selectable by a user's touch gesture.

The operating region decision section 23 determines, with the user holding the housing 11 with one hand, an operating region on the screen of the display section 12 reachable with an operating finger (for example, the thumb) of the one hand from a trace of points of touch on the screen of the display section 12 with the operating finger. Specifically, if the user holds the housing 11 with the right hand as shown in FIG. 3A, the operating region decision section 23 specifies, based on detection signals from the touch panel 13, a trace of points of touch on the screen of the display section 12 with an operating finger U of the right hand, specifies the trace of the points of touch as a boundary line BL on the screen, and determines as an operating region AS one of two divided regions into which the screen of the display section 12 is divided by the boundary line BL, the one divided region containing a contact point T1 where the operating finger U has contacted the screen except the boundary line BL. Thus, the operating region AS can be determined only with the operating finger U of the one hand with which the user holds the housing 11, which provides good operability.

Furthermore, if at least one of start and end points of the trace of points of touch is short of an end of the screen of the display section 12, the operating region decision section 23 specifies the boundary line BL by extending the trace of points of touch to the end of the screen of the display section 12 along the direction of the trace of points of touch. Therefore, even if an end of the trace of points of touch does not reach an end of the screen of the display section 12, the trace of points of touch can be complemented and the operating region AS can thus be properly determined, which provides good operability.

The storage section 15 includes: an operating region storage section 151 that stores region data indicating the operating region AS determined by the operating region decision section 23; and a use frequency storage section 152 that stores the respective frequencies of use of the plurality of objects. The control section 21 allows the use frequency storage section 152 to store, as the frequency of use of each object, for example, the number of accumulated touch gestures on the object for the past predetermined number of days. The frequency of use may be the time of use, the number of uses or the like.

Figure 5:
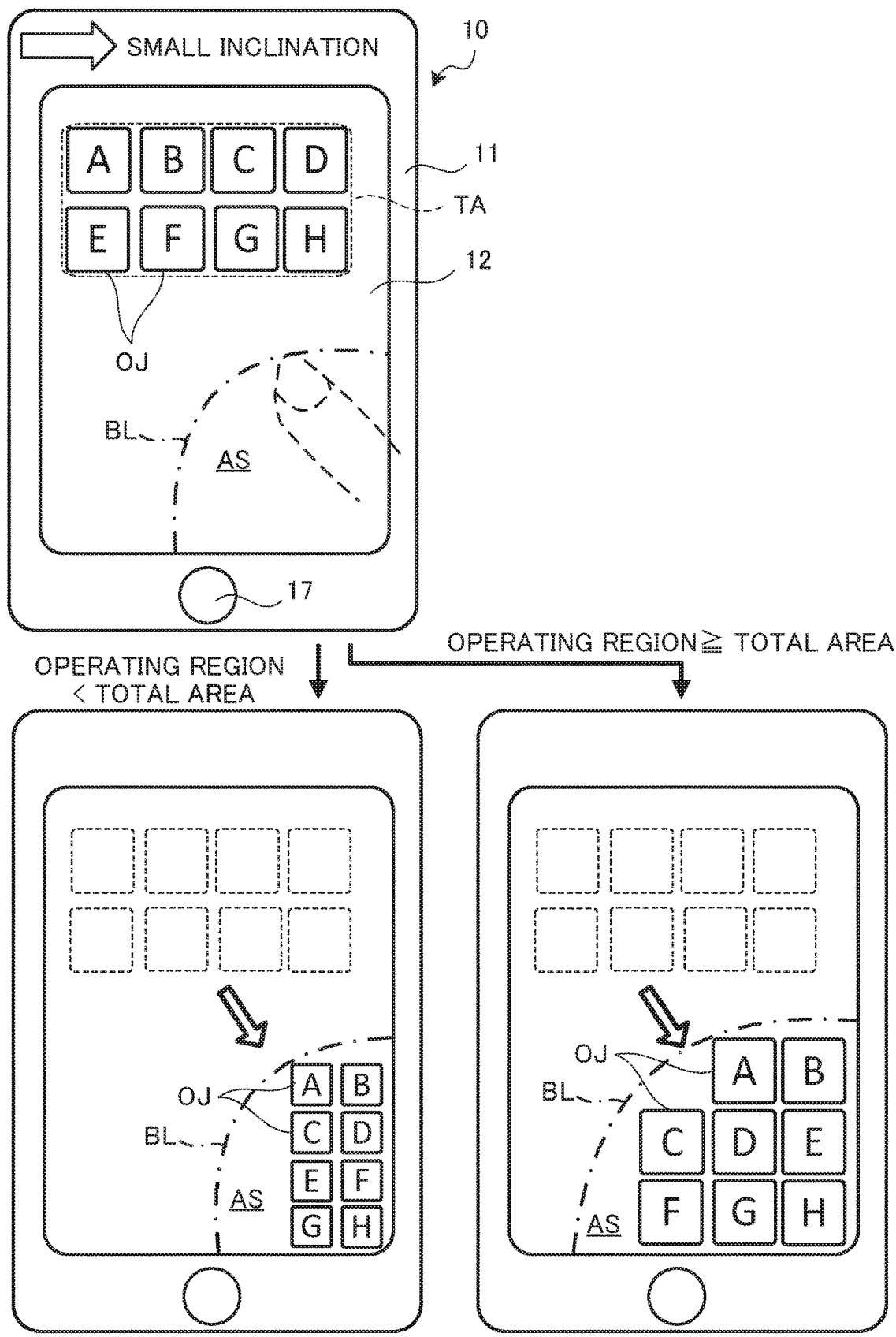
FIG. 5 is a view showing examples of display screen images in the cases of moving and displaying objects within the operating region when the operating region is blank.

The specific inclination determination section 24 determines, after the storage of the region data in the operating region storage section 151, whether or not the inclination of the housing 11 detected by the sensor 16 is a specific inclination toward the operating finger U of the one hand (for example, a lateral inclination toward the right-hand side in an example shown in an upper left part of FIG. 5). The specific inclination is assumed to be an inclination at a predetermined angle (for example, 30 degrees) or more to a later-described reference position of the housing 11. Thus, it can be prevented that an inclination smaller than the specific inclination is erroneously determined to be a specific inclination.

When the detected inclination of the housing 11 is determined to be the specific inclination by the specific inclination determination section 24, the display change section 25 sets a plurality of changed placement locations within the operating region AS, moves the plurality of objects to the set plurality of changed placement locations, respectively, and displays the plurality of objects at the plurality of changed placement locations, respectively. For example, as shown in lower left and lower right parts of FIG. 5, the display change section 25 sets the plurality of changed placement locations within the operating region AS and displays the eight objects OJ from "A" to "H" at these plurality of changed placement locations, respectively.

The area comparison section 26 compares, as shown in the upper left part of FIG. 5, the area of the operating region AS on the screen of the display section 12 with the total area of a region TA including the plurality of objects (eight objects OJ from "A" to "H") arranged at the plurality of predetermined placement locations, respectively. Specifically, the control section 21 calculates the area of the operating region AS from the relationship between the total number of pixels on the screen of the display section 12 previously stored in the storage section 15 and the region data (data on coordinates of pixels on the boundary line BL) stored in the operating region storage section 151. For example, the control section 21 calculates the area of the operating region AS by counting the number of pixels contained in one of the two divided regions into which the screen of the display section 12 is divided by the boundary line BL, the one divided region containing the contact point T1. Furthermore, the control section 21 calculates, in pixel units, the area of display of each object on the screen of the display section 12 and the area of a spaced interval between each adjacent pair of objects and sums the areas of display of all the objects and the areas of all the spaced intervals between the objects to obtain the total area of the region including the plurality of objects arranged at spaced intervals. The area comparison section 26 compares the area of the operating region AS with the total area of the region including the plurality of objects arranged at spaced intervals.

If the comparison result of the area comparison section 26 shows that the total area is larger than the area of the operating region AS, as shown in the lower left part of FIG. 5, the display change section 25 reduces the plurality of objects in size to allow the plurality of objects to fall within the operating region AS, then moves the plurality of objects reduced in size to the plurality of changed placement locations, and displays them at the changed placement locations. On the other hand, if the comparison result of the area comparison section 26 shows that the total area is smaller than the area of the operating region AS, as shown in the lower right part of FIG. 5, the display change section 25 moves the plurality of objects, without reducing the plurality of objects in size, to the plurality of changed placement locations and displays them at the changed placement locations. Thus, the plurality of objects can be appropriately displayed according to the size of the operating region AS set by the user.

Figure 6:
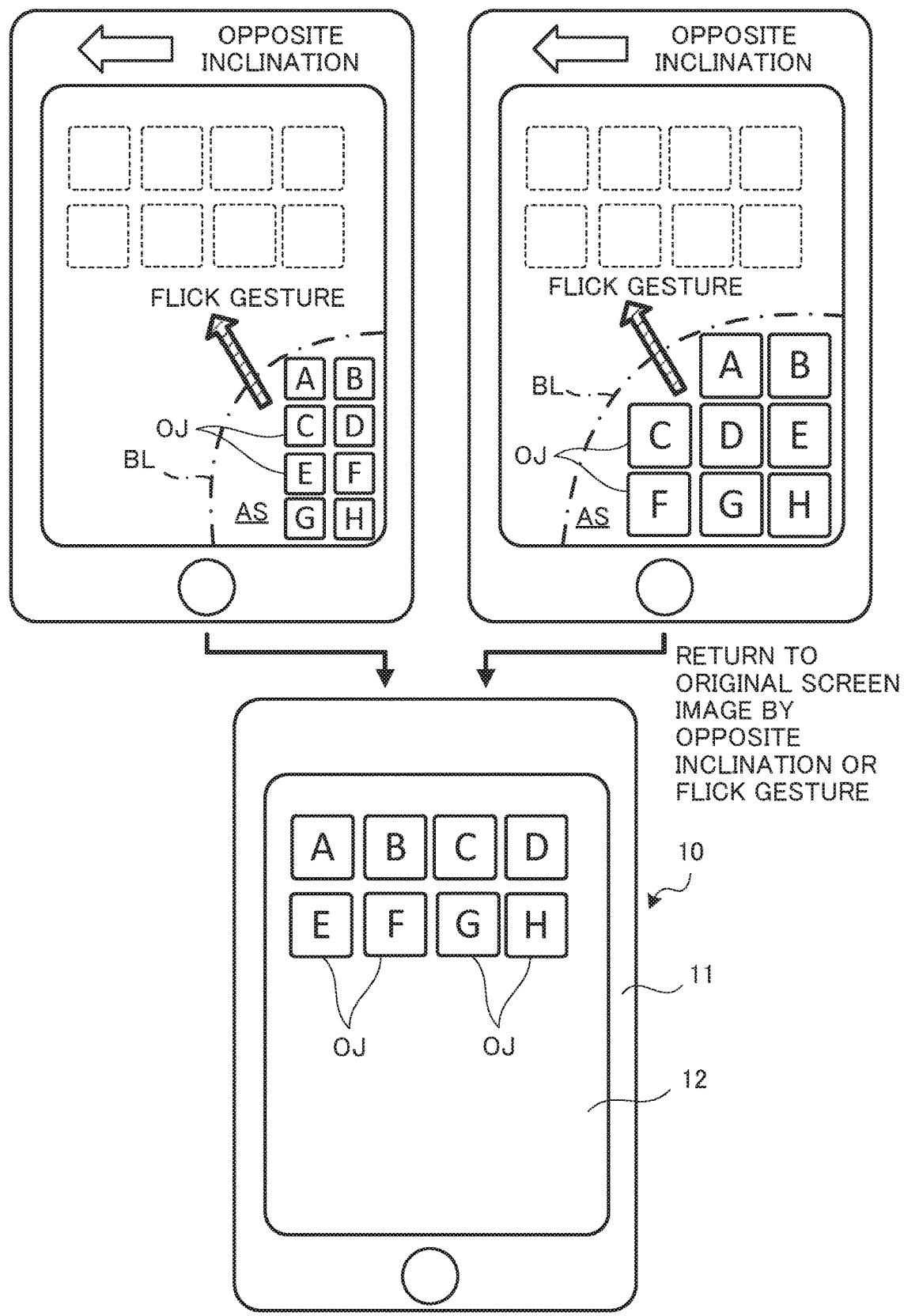
FIG. 6 is a view showing examples of display screen images in the cases of returning the display on a screen from a display of the objects within the operating region to a display of an original screen image.

When, as shown in an upper left part or an upper right part of FIG. 6, the inclination of the housing 11 detected by the sensor 16 is determined to be a return inclination toward the opposite side to the operating finger U of the one hand (for example, a lateral inclination toward the opposite side to the right-hand operating finger U in FIG. 6) by the specific inclination determination section 24 during display of the plurality of objects at the plurality of changed placement locations within the operating region AS by the display change section 25, or when a gesture of sliding the operating finger U touched to within the operating region AS on the screen of the display section 12 toward the plurality of predetermined placement locations (for example, a flick gesture) is detected by the touch panel 13 during display of the plurality of objects at the plurality of changed placement locations within the operating region AS by the display change section 25, the display return section 27 returns the plurality of objects displayed at the plurality of changed placement locations within the operating region AS to the plurality of predetermined placement locations, respectively, and displays the plurality of objects at the plurality of predetermined placement locations, respectively, as shown in a lower middle part of FIG. 6. Thus, the user can return the plurality of objects to their original placement locations simply by inclining the mobile terminal device 10 toward the opposite side to the operating finger U of the one hand, which provides good operability.

The determination section 28 determines whether or not at least one of the plurality of predetermined placement locations is contained within the operating region AS determined by the operating region decision section 23. For example, in an example shown in an upper left part of FIG. 7, the determination section 28 determines that at least one (placement locations for four objects OJ including "K", "L", "O", and "P") of predetermined placement locations for sixteen objects OJ from "A" to "P" is contained within the operating region AS.

When the determination section 28 determines that no predetermined placement location for an object is contained within the operating region AS and the detected inclination of the housing 11 is determined to be a specific inclination by the specific inclination determination section 24, as shown in the lower left and lower right parts of FIG. 5, the display change section 25 moves the plurality of objects to the plurality of changed placement locations, respectively, within the operating region AS indicated by the region data stored in the operating region storage section 151 and displays the plurality of objects at the plurality of changed placement locations, respectively. On the other hand, when the determination section 28 determines that at least one predetermined placement location as described above is contained within the operating region AS and the detected inclination of the housing 11 is determined to be a specific inclination by the specific inclination determination section 24, as shown in the lower left part or lower right part of FIG. 7, the display change section 25 replaces the object(s) located at the at least one predetermined placement location with an object or objects located out of the operating region AS and displays the plurality of objects in reflection of the replacement of the objects. Thus, if one or some objects OJ are contained within the operating region AS set by the user, i.e., even if the operating region AS is not blank, the one or some objects OJ within the operating region AS can be replaced with one or some objects OJ out of the operating region AS and the plurality of objects can be displayed in reflection of the replacement.

When the determination section 28 determines that one or some of the plurality of objects are placed within the operating region AS and the detected inclination of the housing 11 is determined to be a specific inclination by the specific inclination determination section 24, the display change section 25 replaces the one or some objects within the operating region AS with, among the remaining objects out of the operating region AS, one or some objects within a predetermined area located upstream in the direction of the specific inclination and displays the plurality of objects in reflection of the replacement of the objects. Thus, the direction of the specific inclination can be matched with the direction of movement of objects desired to be moved toward the operating region AS, so that the movement of objects operatively associated with a user's gesture for the specific inclination can be achieved.

Furthermore, the specific inclination determination section 24 determines, as the specific inclination, a first specific inclination which is an inclination of the screen of the display section 12 from one toward the other of the vertical sides of the screen (a later-described lateral inclination shown in FIG. 10A), a second specific inclination from one toward the other of a pair of diagonal corners of the screen (a diagonal inclination shown in FIG. 10B) or a third specific inclination from one toward the other of the horizontal sides of the screen (a fore-and-aft inclination shown in FIG. 10C). When the determination section 28 determines that one or some of the plurality of objects are placed within the operating region AS and the detected inclination of the housing 11 is determined to be the first specific inclination by the specific inclination determination section 24, as shown in FIG. 10A, the display change section 25 replaces the one or some objects within the operating region AS with, among the remaining objects out of the operating region AS, one or some objects within a lateral end area which is the predetermined area located upstream in the direction of the first specific inclination and displays the plurality of objects in reflection of the replacement of the objects. When the determination section 28 determines that one or some of the plurality of objects are placed within the operating region AS and the detected inclination of the housing 11 is determined to be the second specific inclination by the specific inclination determination section 24, as shown in FIG. 10B, the display change section 25 replaces the one or some objects within the operating region AS with, among the remaining objects out of the operating region AS, one or some objects within a diagonal end area which is the predetermined area located upstream in the direction of the second specific inclination and displays the plurality of objects in reflection of the replacement. When the determination section 28 determines that one or some of the plurality of objects are placed within the operating region As and the detected inclination of the housing 11 is determined to be the third specific inclination by the specific inclination determination section 24, as shown in FIG. 10C, the display change section 25 replaces the one or some objects within the operating region AS with, among the remaining objects out of the operating region AS, one or some objects within a vertical end area which is the predetermined area located upstream in the direction of the third specific inclination and displays the plurality of objects in reflection of the replacement. Thus, objects desired to be moved into the operating region AS by the user can be moved into the operating region AS simply by selecting one of the first to third specific inclinations (the lateral, diagonal, and fore-and-aft inclinations) according to the placement locations of the objects desired to be moved, which provides good operability.

The first specifying section 29 uses the respective frequencies of use of the plurality of objects stored in the use frequency storage section 152 to specify, among the above one or some objects within the operating region AS, an object having the lowest frequency of use and specify, among the objects out of the operating region AS and within the predetermined area located upstream in the direction of the specific inclination, an object having the highest frequency of use. When the determination section 28 determines that one or some of the plurality of objects are placed within the operating region AS and the detected inclination of the housing 11 is determined to be the specific inclination by the specific inclination determination section 24, the display change section 25 replaces the object having the lowest frequency of use with the object having the highest frequency of use and displays the plurality of objects in reflection of the replacement between the two objects. Thus, since the object having the lowest frequency of use within the operating region AS is replaced with the object having the highest frequency of use out of the operating region AS and the plurality of objects are displayed in reflection of the replacement, the object most likely to be used by the user can be moved into the operating region AS, which provides good operability.

The mobile terminal device 10 contains, other than the above components, a speaker, a microphone, LEDs, a vibrator, and so on, but these components are not given in FIG. 2 for convenience sake.

As described previously, in the mobile terminal device 10, various objects (on-screen images), such as buttons, are displayed on the screen of the display section 12 by the launched app. In operating the mobile terminal device 10 with one hand, the user holds the mobile terminal device 10 with the fingers other than the operating finger U (the thumb) and operates the on-screen images with the freely movable operating finger U. In doing so, in the case of a mobile terminal device 10 including a display section 12 having a large-sized screen with approximately 5 inches or more, the operating finger U may not reach ends of the screen of the display section 12 as shown in FIGS. 3A and 3B. In a well-known general mobile terminal device, objects (buttons) placed at such locations unreachable with the operating finger U need to be operated with the other hand. As a solution to this problem, in the first embodiment, as shown in FIG. 5, with just a small inclination of the mobile terminal device 10 toward the operating finger U (thumb) of the one hand with which the user holds the mobile terminal device 10, the user can move objects OJ into the operating region AS reachable with the operating finger U. Thus, the operations of objects with one hand are enabled even if the screen size of the display section 12 is relatively large.

Figure 4:
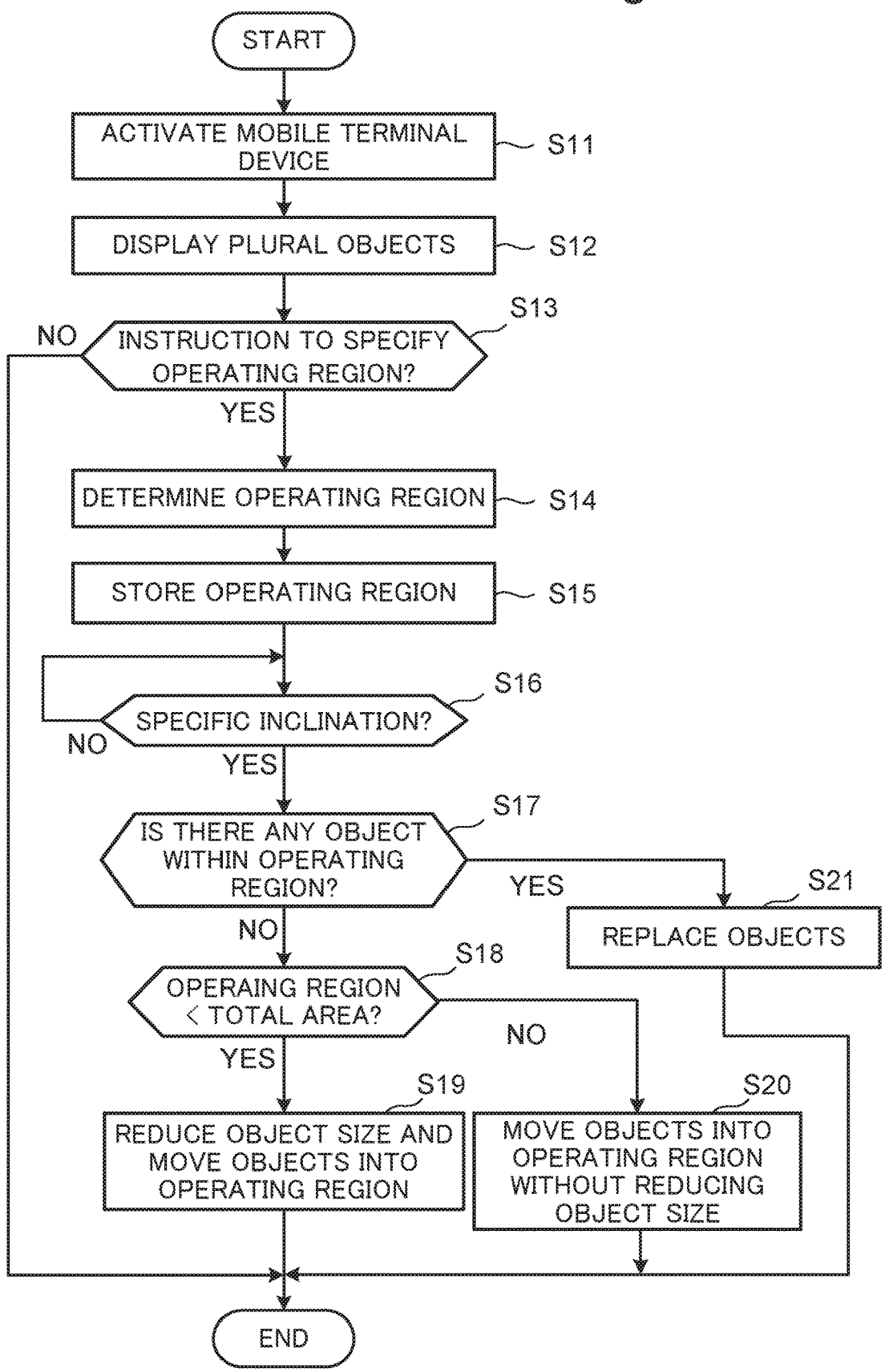
FIG. 4 is a flowchart showing an example of object movement and display processing in the first embodiment.

Next, a description will be given of object movement and display processing in the mobile terminal device 10 according to the first embodiment, with reference to the flowchart shown in FIG. 4. FIG. 4 is a flowchart showing an example of the object movement and display processing in the first embodiment.

Upon power application to the mobile terminal device 10, the mobile terminal device 10 is activated (S11). Furthermore, the display control section 22 allows the display section 12 to display, at a plurality of predetermined placement locations on the screen, a plurality of objects selectable by a user's touch gesture (S12: display control step). For example, as shown in FIGS. 3A and 3B, eight objects OJ from "A" to "H" are displayed at 2×4 matrix placement locations including two vertical and four horizontal placement locations on an upper portion of the screen of the display section 12. When the mobile terminal device 10 is held with the right hand as shown in FIG. 3A, the eight objects OJ are located out of the operating region AS reachable with the operating finger U of the right hand and, therefore, any touch gestures cannot be made on the objects OJ with the operating finger U of the right hand. Also when the mobile terminal device 10 is held with the left hand as shown in FIG. 3B, like with the right hand, any touch gestures cannot be made on the objects OJ with the operating finger U of the left hand.

The control section 21 determines whether there is an instruction to specify the operating region AS (S13). For example, if a specification gesture (for example, a double tap) on the hard button 17 has been made, the control section 21 determines that there is an instruction to specify the operating region AS (YES in S13). When the control section 21 determines that there is an instruction to specify the operating region AS (YES in S13), the operating region decision section 23 determines, with the user holding the housing 11 with one hand, the operating region AS on the screen of the display section 12 reachable with the operating finger U of the one hand from a trace of points of touch on the screen of the display section 12 with the operating finger U (S14: operating region decision step).

Specifically, with the user holding the housing 11 with the right hand as shown in FIG. 3A, the operating region decision section 23 specifies the boundary line BL from a trace of points of touch on the screen of the display section 12 with the operating finger U of the right hand and determines as the operating region AS one of two divided regions into which the screen of the display section 12 is divided by the boundary line BL, the one divided region containing a contact point T1 where the operating finger U has contacted the screen except for the boundary line BL. For example, during an arc-like sequence of touch gestures on the screen with the operating finger U of the right hand, the base or so on of the operating finger U is likely to discretely contact the screen. The touch panel 13 detects one or more contact points T1 where the base or so on of the operating finger U has discretely contacted the screen. If no contact point T1 has been detected, the control section 21 allows the display section 12 to display on the screen a prompting display for prompting the user to touch an arbitrary point on the screen closer to the operating finger U than the boundary line BL with the operating finger U. When the user having seen the prompting display touches the above point on the screen, the contact point T1 is detected by the touch panel 13. The operating region decision section 23 determines the operating region AS from the boundary line BL and the contact point(s) T1.

The control section 21 allows the operating region storage section 151 to store region data indicating the operating region AS determined by the operating region decision section 23 (S15: operating region storage step).

Figure 7:
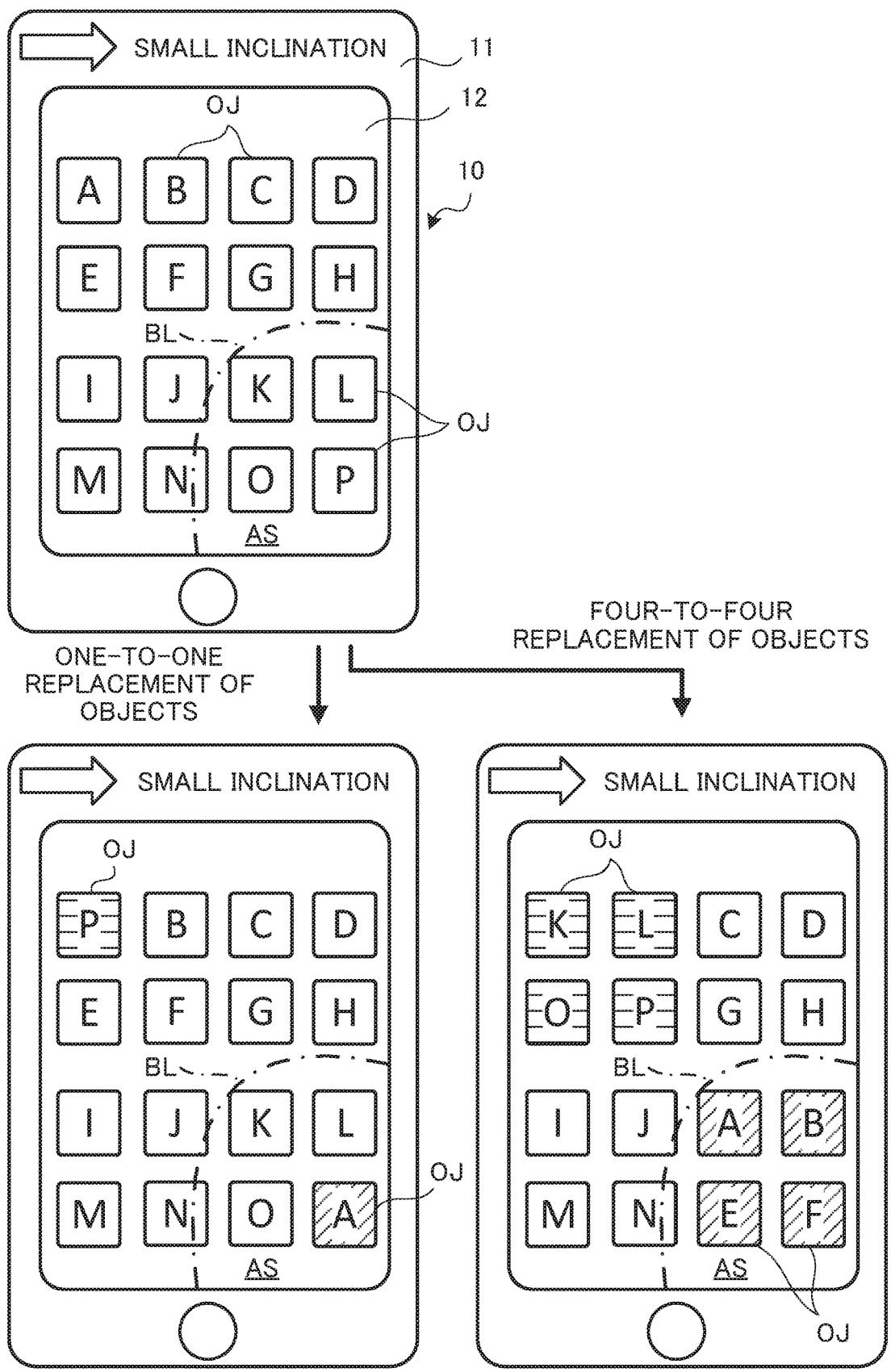
FIG. 7 is a view showing examples of display screen images in the cases where when the operating region contains one or some of the objects, the one or some objects are replaced with one or some of the remaining objects.

The specific inclination determination section 24 determines, after the storage of the region data in the operating region storage section 151, whether or not the inclination of the housing 11 detected by the sensor 16 is a specific inclination toward the operating finger of the one hand (S16: specific inclination determination step). When the specific inclination determination section 24 determines that the inclination of the housing 11 detected by the sensor 16 is a specific inclination (YES in S16), the determination section 28 determines whether or not at least one of the plurality of predetermined placement locations is contained within the operating region AS determined by the operating region decision section 23 (S17). For example, if no object is located within the operating region AS as shown in FIG. 3, the determination section 28 determines that no predetermined placement location is contained within the operating region AS (NO in S17). If at least one object is located within the operating region AS as shown in FIG. 7, the determination section 28 determines that at least one predetermined placement location is contained within the operating region AS (YES in S17).

When the determination section 28 determines that no predetermined placement location for an object is contained within the operating region AS (NO in S17), the area comparison section 26 compares the area of the operating region AS on the screen of the display section 12 with the total area of the region including the plurality of objects arranged at the plurality of predetermined placement locations, respectively (S18).

If the comparison result of the area comparison section 26 shows that the total area is larger than the area of the operating region AS (YES in S18), as shown in the lower left part of FIG. 5, the display change section 25 reduces the plurality of objects in size to allow all the plurality of objects to fall within the operating region AS, then moves the plurality of objects reduced in size to the plurality of changed placement locations, respectively, and displays them at the changed placement locations (S19: display change step). On the other hand, if the comparison result of the area comparison section 26 shows that the total area is smaller than the area of the operating region AS (NO in S18), as shown in the lower right part of FIG. 5, the display change section 25 moves the plurality of objects, without reducing their sizes, to the plurality of changed placement locations, respectively, and displays them at the changed placement locations (S20: display change step).

To sum up, when the detected inclination of the housing 11 is determined to be a specific inclination by the specific inclination determination section 24, the display change section 25 sets a plurality of changed placement locations within the operating region AS, moves the plurality of objects to the set plurality of changed placement locations, respectively, and displays the plurality of objects at the plurality of changed placement locations, respectively.

When, as shown in the upper left part or the upper right part of FIG. 6, the inclination of the housing 11 detected by the sensor 16 is determined to be a return inclination toward the opposite side to the operating finger of the one hand by the specific inclination determination section 24 during display of the plurality of objects at the plurality of changed placement locations within the operating region AS by the display change section 25, or when a gesture of sliding the operating finger touched to within the operating region AS on the screen of the display section 12 toward the plurality of predetermined placement locations (for example, a flick gesture) is detected by the touch panel 13 during display of the plurality of objects at the plurality of changed placement locations within the operating region AS by the display change section 25, the display return section 27 returns the plurality of objects displayed at the plurality of changed placement locations within the operating region AS to the plurality of predetermined placement locations, respectively, and displays the plurality of objects at the respective predetermined placement locations as shown in the lower middle part of FIG. 6.

On the other hand, when the determination section 28 determines that at least one predetermined placement location for an object is contained within the operating region AS (YES in S17) and the detected inclination of the housing 11 is determined to be a specific inclination by the specific inclination determination section 24, the display change section 25 replaces the object(s) located at the at least one predetermined placement location with an object or objects located out of the operating region AS and displays the plurality of objects in reflection of the replacement of the objects (S21: display change step). For example, as shown in the upper left and lower right parts of FIG. 7, the display change section 25 replaces objects (four objects OJ including "K", "L", "O", and "P") located within the operating region AS with, among the remaining objects out of the operating region AS, objects (four objects OJ including "A", "B", "E", and "F") within the predetermined area located upstream in the direction of the specific inclination and displays the plurality of objects in reflection of the replacement of the objects. In place of the simultaneous replacement of a plurality of objects located within the operating region AS as in the above manner, for example, as shown in the upper left and lower left parts of FIG. 7, the display change section 25 may replace one (an object OJ "P") of the objects within the operating region AS with, among the remaining objects out of the operating region AS, one object (an object OJ "A") within the predetermined area located upstream in the direction of the specific inclination and display the plurality of objects in reflection of the replacement between the two objects.

Figure 8A:
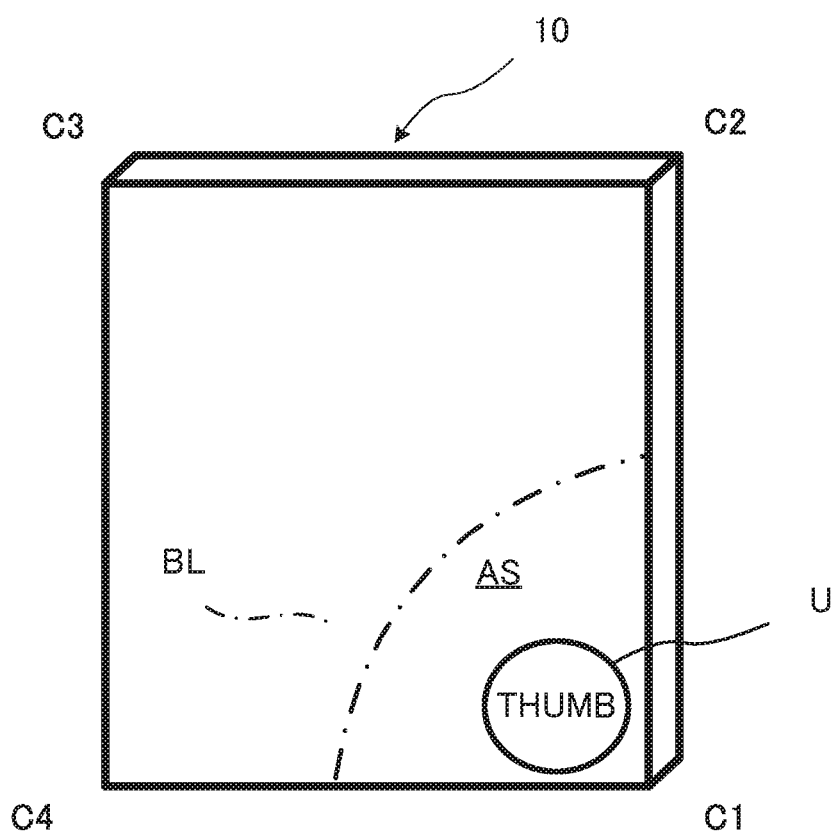
FIG. 8A is a view showing the operating region of the right hand on the mobile terminal device and the corners of the mobile terminal device.
Figure 8B:
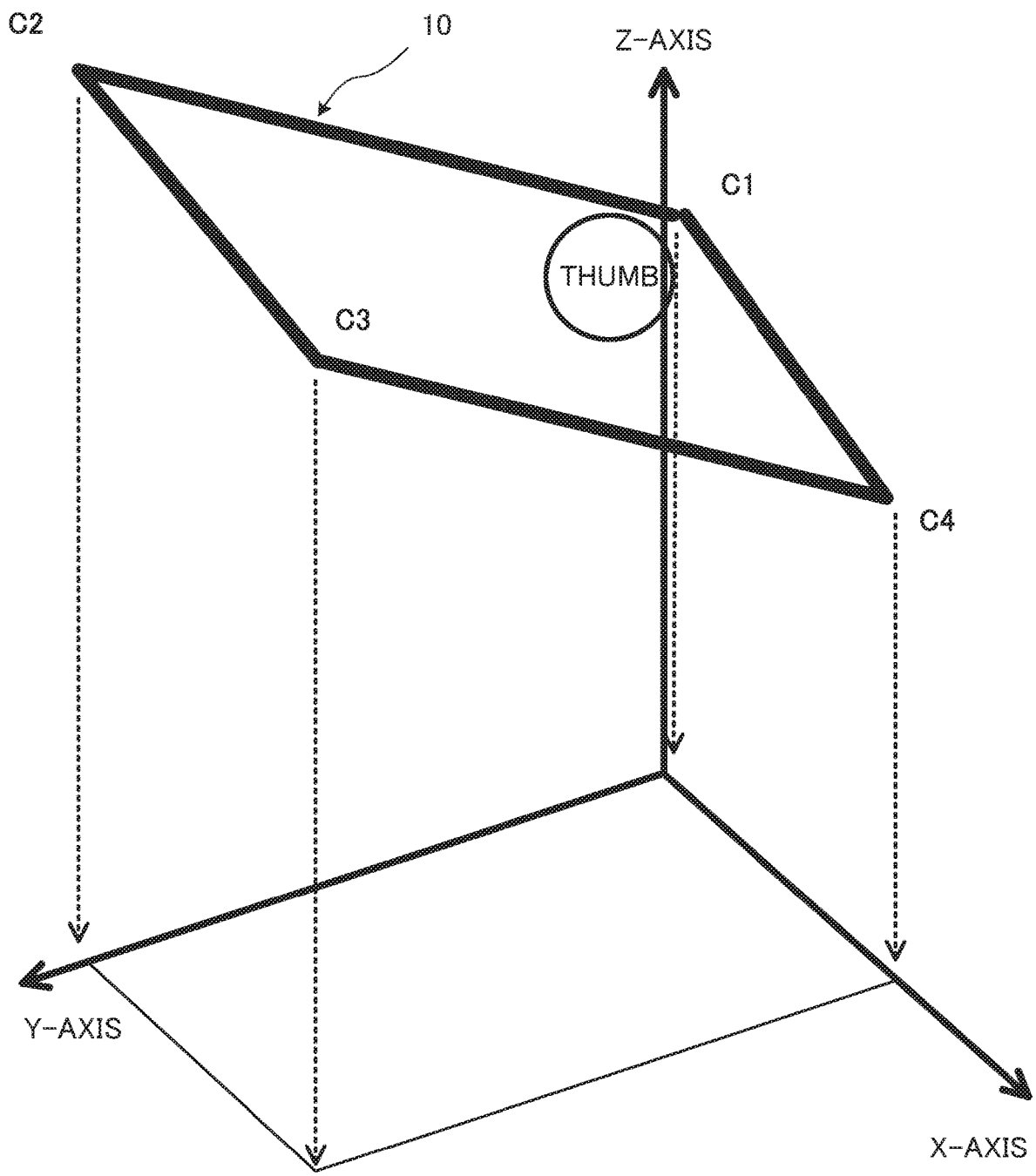
FIG. 8B is a diagram showing a triaxial coordinate system for identifying a normal inclination of the mobile terminal device during operation with the right hand.

A description will be given below of determination of a specific inclination of the mobile terminal device 10 (housing 11) made by the specific inclination determination section 24, with reference to FIGS. 8 and 9. As shown in FIG. 8A, the sensor 16 acquires triaxial coordinate values of four points C1 to C4 including the lower right, upper right, upper left, and lower left corners of the mobile terminal device 10. The specific inclination determination section 24 sets as a reference position a position where the user holds the housing 11 with one hand as shown in FIG. 8B and determines whether or not the inclination of the housing 11 to the reference position is a specific inclination as shown in FIGS. 9A to 9C.

(1) First, the specific inclination determination section 24 sets as the reference position the angle of inclination of the mobile terminal device 10 when the user determines the operating region AS with the operating finger of the one hand. In other words, the specific inclination determination section 24 sets reference inclination coordinates. For example, the specific inclination determination section 24 projects the triaxial coordinate values of the above four points C1 to C4 of the housing 11 onto an XY-axis plane of the triaxial coordinate system and sets this state as the reference position.

(2) The specific inclination determination section 24 detects, using the triaxial coordinate values of the four points acquired by the sensor 16, in which direction the housing 11 is inclined from the above reference position. For example, as shown in FIG. 9, the specific inclination determination section 24 detects, from the triaxial coordinate values of the four points C1 to C4 projected onto the XY-axis plane and the triaxial coordinate values of the four points C1 to C4 when the housing 11 is inclined, respective inclination vectors of the four coordinates and identifies, based on the magnitudes of the inclination vectors of the four coordinates, in which direction the housing 11 is inclined. For example, in the case of a lateral inclination shown in FIG. 9A, the inclination vectors of points C3 and C4 are greater than the inclination vectors of points C1 and C2. Thus, a lateral inclination is detected. Note that if the value of an inclination vector is equal to or more than a predetermined value, the inclination vector is treated as a value to be detected, but if the value of an inclination vector is less than the predetermined value, the inclination vector is considered as an error and not detected.

Furthermore, as shown in FIG. 10A, when the specific inclination determination section 24 determines that the inclination of the screen of the display section 12 is the first specific inclination (lateral inclination) from one toward the other of the vertical sides of the screen, the display change section 25 replaces one or some objects (four objects OJ including "K", "L", "O", and "P") located within the operating region AS with, among the remaining objects out of the operating region AS, one or some objects (four objects OJ including "A", "E", "I", and "M") within the lateral end area which is the predetermined area located upstream in the direction of the first specific inclination and displays all the objects in reflection of the replacement of the objects.

As shown in FIG. 10B, when the specific inclination determination section 24 determines that the inclination of the screen of the display section 12 is the second specific inclination (diagonal inclination) from one toward the other of a pair of diagonal corners of the screen, the display change section 25 replaces one or some objects (four objects OJ including "K", "L", "O", and "P") located within the operating region AS with, among the remaining objects out of the operating region AS, one or some objects (four objects OJ including "A", "B", "E", and "F") within the diagonal end area which is the predetermined area located upstream in the direction of the second specific inclination and displays all the objects in reflection of the replacement of the objects.

As shown in FIG. 10C, when the specific inclination determination section 24 determines that the inclination of the screen of the display section 12 is the third specific inclination (fore-and-aft inclination) from one toward the horizontal sides of the screen, the display change section 25 replaces one or some objects (four objects OJ including "K", "L", "O", and "P") located within the operating region AS with, among the remaining objects out of the operating region AS, one or some objects (four objects OJ including "A", "B", "C", and "D") within the vertical end area which is the predetermined area located upstream in the direction of the third specific inclination and displays all the objects in reflection of the replacement of the objects.

Referring back to FIG. 4, when the control section 21 determines that there is no instruction to specify the operating region AS (NO in S13) or after the processing step S19, S20 or S21, the control section 21 ends this processing. When the touch panel 13 detects a touch gesture on one of the objects moved into the operating region AS, the control section 21 controls the operation associated with the object on which the touch gesture has been made. In other words, an app associated with the object on which the touch gesture has been made is launched.

As thus far described, according to the first embodiment, since, with the user holding the mobile terminal device 10 with one hand, the operating region AS on the screen of the display section 12 reachable with the operating finger U of the one hand is determined from a trace of points of touch on the screen with the operating finger U, an appropriate operating region AS can be set according to users' characteristics. For example, even a small-handed user, such as a child or a woman, can set an appropriate operating region AS. Furthermore, since, after the determination of the operating region AS, objects OJ on the screen of the display section 12 are moved into and displayed within the operating region AS simply by inclining the mobile terminal device 10 toward the operating finger U, the user can make touch gestures on the objects OJ within the operating region AS with the operating finger U. For example, even in the case of a large-sized mobile terminal device or a mobile terminal device equipped with a protective case, objects OJ on the screen of the display section 12 can be moved into and displayed within the operating region AS simply by inclining the mobile terminal device 10 toward the operating finger U, so that the objects OJ can surely be brought to locations reachable with the operating finger U. Thus, the operability of the mobile terminal device 10 with one hand can be improved.

Even if, in the technique described previously in BACKGROUND, a small-handed user, for example, a child or a woman, holds the housing of a mobile terminal device and tries to bring distant buttons close to his/her operating finger, the reach of the finger is small and, therefore, some of the distant buttons may not be able to be brought within the reach of the finger, in which case these buttons cannot be operated with one hand. Furthermore, in the case of a large-sized mobile terminal device, the user cannot hold its housing with one hand and cannot bring distant buttons within the reach of his/her operating finger. Moreover, in a state where a mobile terminal device is covered with a protective case, the user cannot directly hold its housing and, therefore, the user's grip force cannot accurately be detected, so that the user may not be able to bring buttons within the reach of his/her operating finger.

Unlike the above known technique, in this embodiment, the operability of a mobile terminal device with one hand can be improved.

Figure 11:
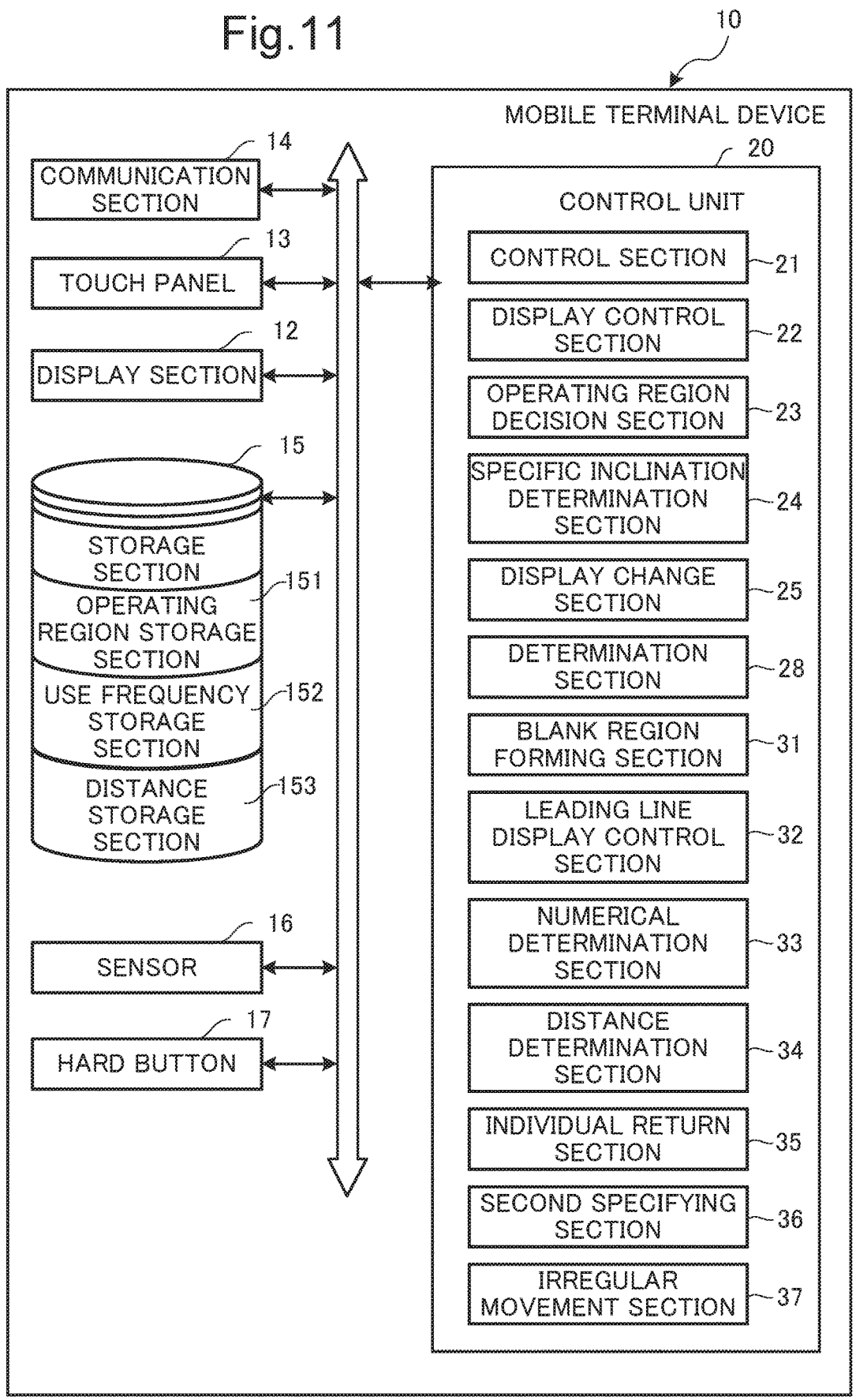
FIG. 11 is a block diagram showing the configuration of a mobile terminal device according to a second embodiment of the present disclosure.

Next, a description will be given of a mobile terminal device 10 according to a second embodiment with reference to FIGS. 11 to 14. FIG. 11 is a block diagram showing the configuration of the mobile terminal device 10 according to the second embodiment. Among the components shown in FIG. 11, the same components as those shown in FIG. 2 related to the above-described first embodiment are designated by the same references and further explanation thereof will be omitted.

The control unit 20 shown in FIG. 11 includes a blank region forming section 31, a leading line display control section 32, a numerical determination section 33, a distance determination section 34, an individual return section 35, a second specifying section 36, and an irregular movement section 37.

The blank region forming section 31 forms a blank region BA within the operating region AS as shown in FIG. 13B, when the detected inclination of the housing 11 is determined to be a specific inclination by the specific inclination determination section 24 and the determination section 28 determines that at least one predetermined placement location is contained within the operating region AS.

The leading line display control section 32 allows the display of a plurality of leading lines (two leading lines L1 and ten leading lines L2 in FIG. 13C) running from all the objects (twelve objects OJ from "A to "N" in FIG. 13A) out of the operating region AS toward the blank region BA.

When the touch panel 13 detects a gesture (drag gesture) of moving one (the leading line L1 for an object OJ "A" in FIG. 13C) of the plurality of leading lines toward the blank region BA with the operating finger U of the right hand being touched to the one leading line, the display change section 25 moves the object (the object OJ "A" in FIG. 13D) connected to the one leading line into the blank region BA and displays the object within the blank region BA. Thus, a new interesting movement gesture named a drag gesture can be provided.

The numerical determination section 33 determines, using the respective frequencies of use of the plurality of objects stored in the use frequency storage section 152, whether or not the frequency of use of each of the objects (twelve objects OJ from "A" to "N" in FIG. 13A) connected to the leading lines (two leading lines L1 and ten leading lines L2 in FIG. 13C) is equal to or more than a predetermined value.

When the numerical determination section 33 determines that the frequencies of use of one or a plurality of the objects (twelve objects OJ from "A" to "N" in FIG. 13A) connected to the leading lines are equal to or more than the predetermined value, the leading line display control section 32 allows the display of the leading line(s) (two leading lines L1 in FIG. 13C) in a first display manner (for example, a solid line). When the numerical determination section 33 determines that the frequencies of use of one or a plurality of the objects connected to the leading lines are less than the predetermined value, the leading line display control section 32 allows the display of the leading line(s) (ten leading lines L2 in FIG. 13C) in a second display manner (for example, a thin line) different from the first display manner. Since the display manner of the leading line varies depending on the frequency of use of the object as just described, the user can drag the object closer in consideration of the frequency of use.

Although in the above description the display manner of the leading line is varied with the frequency of use of the object OJ, the display manner of the leading line may be varied depending on the distance from the object to the blank region BA. For example, the storage section 15 includes a distance storage section 153 that stores the respective distances from the plurality of objects to the blank region BA. The distance determination section 34 determines, using the above distances regarding the plurality of objects (twelve objects OJ from "A" to "N" in FIG. 13A) stored in the distance storage section 153, whether or not the distance from each of the objects connected to the leading lines to the blank region BA is equal to or more than a predetermined reference distance. When the distance determination section 34 determines that the distance from the object connected to the leading line to the blank region BA is equal to or more than the above reference distance, the leading line display control section 32 allows the display of the leading line in a first display manner (for example, a solid line). When the distance determination section 34 determines that the distance from the object connected to the leading line to the blank region BA is less than the reference distance, the leading line display control section 32 allows the display of the leading line in a second display manner (for example, a thin line) different from the first display manner. Since the display manner of the leading line varies depending on the distance from the object to the blank region BA as just described, the user can easily identify the object that he/she desires to drag closer.

Figure 14A:
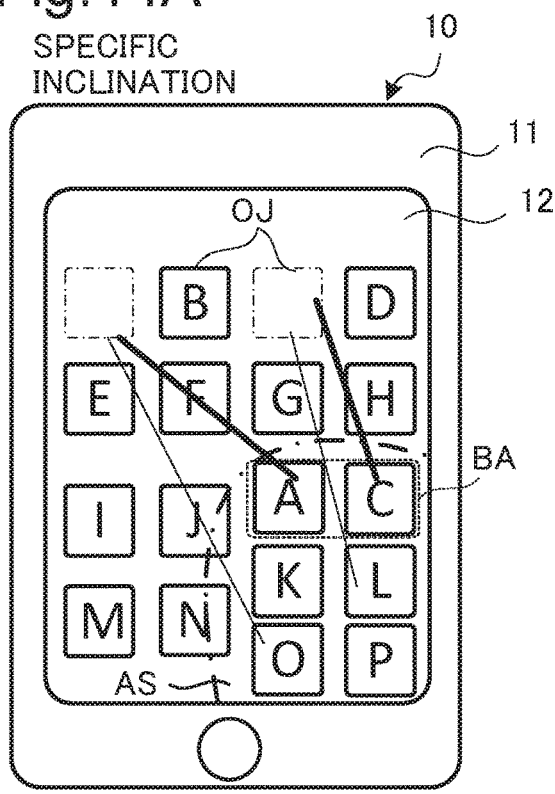
FIGS. 14A to 14D are views showing examples of display screen images in the case of moving an object within the operating region to the outside of the operating region in the second embodiment.
Figure 14B:
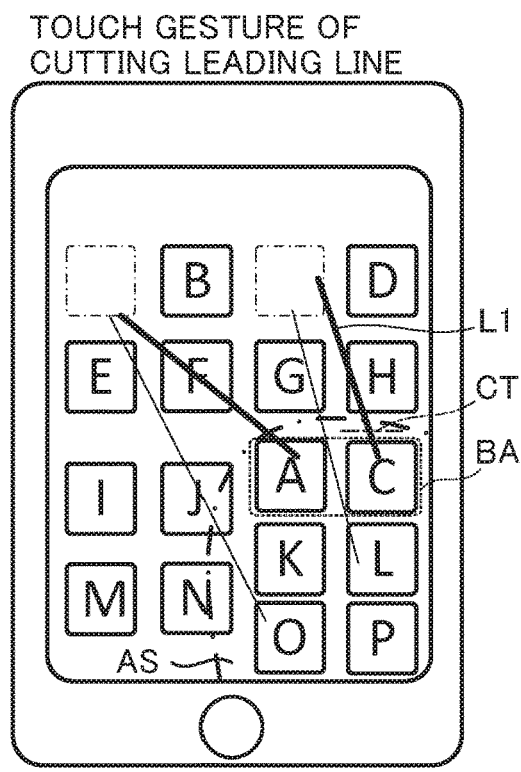

When the display change section 25 moves and displays objects connected to leading lines within the blank region BA as shown in FIG. 14A and the touch panel 13 detects a cut gesture CT which is a touch gesture of cutting across one leading line (the leading line L1 for the object OJ "C") with the operating finger U as shown in FIG. 14B, the individual return section 35 returns the object (the object OJ "C" in FIG. 14C) having been moved and displayed within the blank region BA to its original placement location out of the operating region AS and displays the object at the original placement location. Thus, the gesture of dragging an object closer and the cut gesture CT for a leading line can be made different from each other, which makes gestures for moving objects more understandable.

Figure 14C:
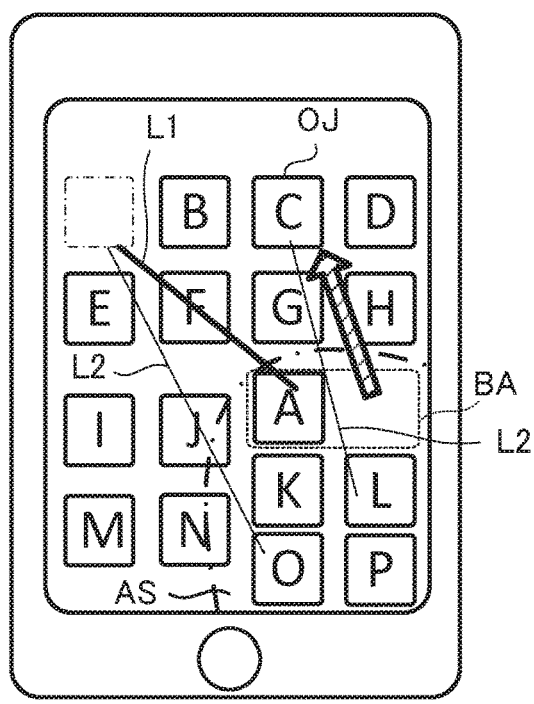
Figure 14D:
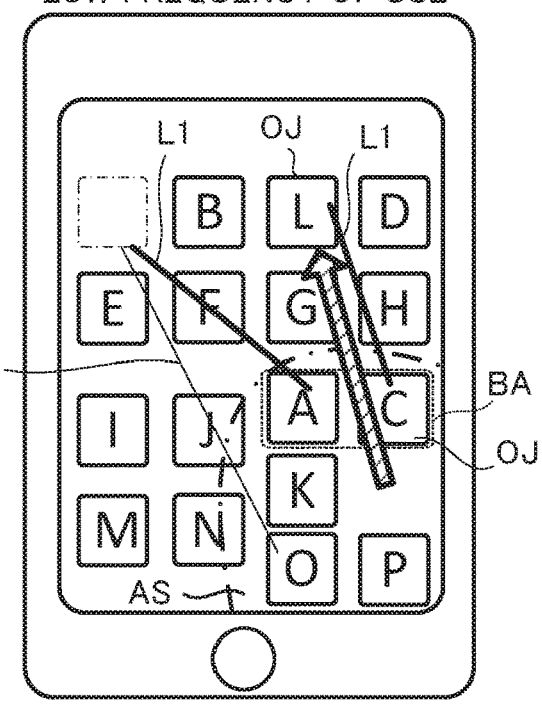

Although in the above description the object OJ the leading line for which has been cut is moved out of the operating region AS as shown in FIG. 14C, an object having a low frequency of use may be moved out of the operating region AS as shown in FIG. 14D. For example, the second specifying section 36 specifies, among the objects within the operating region AS, an object having the lowest frequency of use, using the frequencies of use of the plurality of objects stored in the use frequency storage section 152. When an object connected to one leading line is moved into the blank region BA, the leading line display control section 32 allows the display of the one leading line L1 in a third display manner (for example, a red line) and allows the display of the leading line L2 for the object specified to have the lowest frequency of use within the operating region AS by the second specifying section 36 in a fourth display manner (for example a black line) different from the third display manner.

When the touch panel 13 detects a cut gesture CT which is a touch gesture of cutting across the one leading line L1 with the operating finger of the one hand, the one leading line L1 being allowed to be displayed in the third manner by the leading line display control section 32, the irregular movement section 37 moves, instead of the object OJ connected to the leading line L1 displayed in the third display manner, the object OJ having the lowest frequency of use within the operating region AS and connected to the leasing line L2 displayed in the fourth display manner to a placement location out of the operating region AS and displays the object OJ having the lowest frequency of use at the placement location. Thus, the object OJ having the lowest frequency of use is excluded from the operating region AS, so that a set of objects OJ having higher frequencies of use can be established in the operating region AS.

Figure 12:
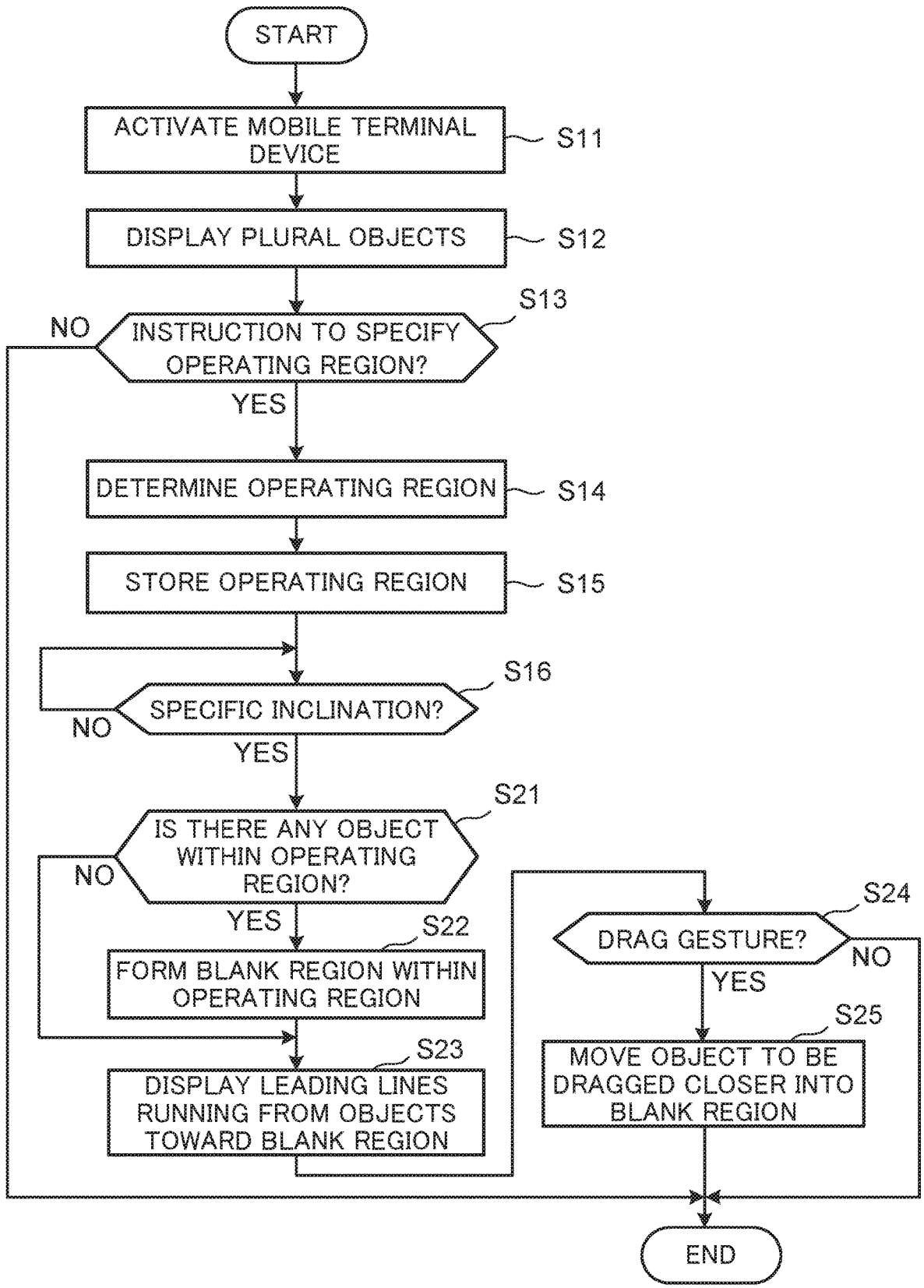
FIG. 12 is a flowchart showing an example of object movement and display processing in the second embodiment.

Next, a description will be given of object movement and display processing in the mobile terminal device 10 according to the second embodiment, with reference to the flowchart shown in FIG. 12. FIG. 12 is a flowchart showing an example of the object movement and display processing in the second embodiment. The processing steps S11 to S16 are the same as in the first embodiment shown in FIG. 4 and, therefore, the processing step S21 and later processing steps will be described below.

The determination section 28 determines whether or not at least one of the plurality of predetermined placement locations for the plurality of objects is contained within the operating region AS (S21: determination step). If at least one object is located within the operating region AS as shown in FIG. 13A, the determination section 28 determines that at least one predetermined placement location is contained within the operating region AS (YES in S21). If no object is located within the operating region AS, the determination section 28 determines that no predetermined placement location is contained within the operating region AS (NO in S21).

When the detected inclination of the housing 11 is determined to be a specific inclination by the specific inclination determination section 24 (YES in S16) and the determination section 28 determines that at least one predetermined placement location is contained within the operating region AS (YES in S21), the blank region forming section 31 forms a blank region BA within the operating region AS as shown in FIG. 13B (S22: blank region forming step).

When a blank region BA is formed (S22) or if no object is located within the operating region AS (NO in S21), the leading line display control section 32 allows the display of a plurality of leading lines (two leading lines L1 and ten leading lines L2 in FIG. 13C) running from all the objects (twelve objects OJ from "A to "N" in FIG. 13A) out of the operating region AS toward the blank region BA (S23: leading line display step).

The control section 21 determines, based on a detection signal from the touch panel 13, whether or not a drag gesture has been made (S24). When the touch panel 13 detects a gesture (drag gesture) of moving one (the leading line L1 for an object OJ "A" in FIG. 13C) of the plurality of leading lines toward the blank region BA with the operating finger U of the right hand being touched to the one leading line (YES in S24), the display change section 25 moves the object (the object OJ "A" in FIG. 13D) connected to the one leading line into the blank region BA and displays the object within the blank region BA (S25: display change step). On the other hand, if no drag gesture has been made (NO in S24), the control section 21 ends this processing.

When the control section 21 determines that there is no instruction to specify the operating region AS (NO in S13) or after the processing step S25, the control section 21 ends this processing.

As thus far described, according to the second embodiment, an appropriate operating region AS can be set, like the above-described first embodiment. Furthermore, when the mobile terminal device 10 is inclined toward the operating finger U, the plurality of leading lines L1, L2 running from all the objects OJ out of the operating region AS toward the blank region BA in the operating region AS are displayed. When in this state a gesture of touching one leading line L1 with the operating finger U and dragging it closer is made, the object OJ connected to this leading line L1 is moved into the blank region BA. Therefore, the object OJ can surely be brought within the reach of the operating finger U. Thus, the operability of the mobile terminal device 10 with one hand can be improved. In addition, a new interesting movement gesture named a drag gesture can be provided.

Figure 15:
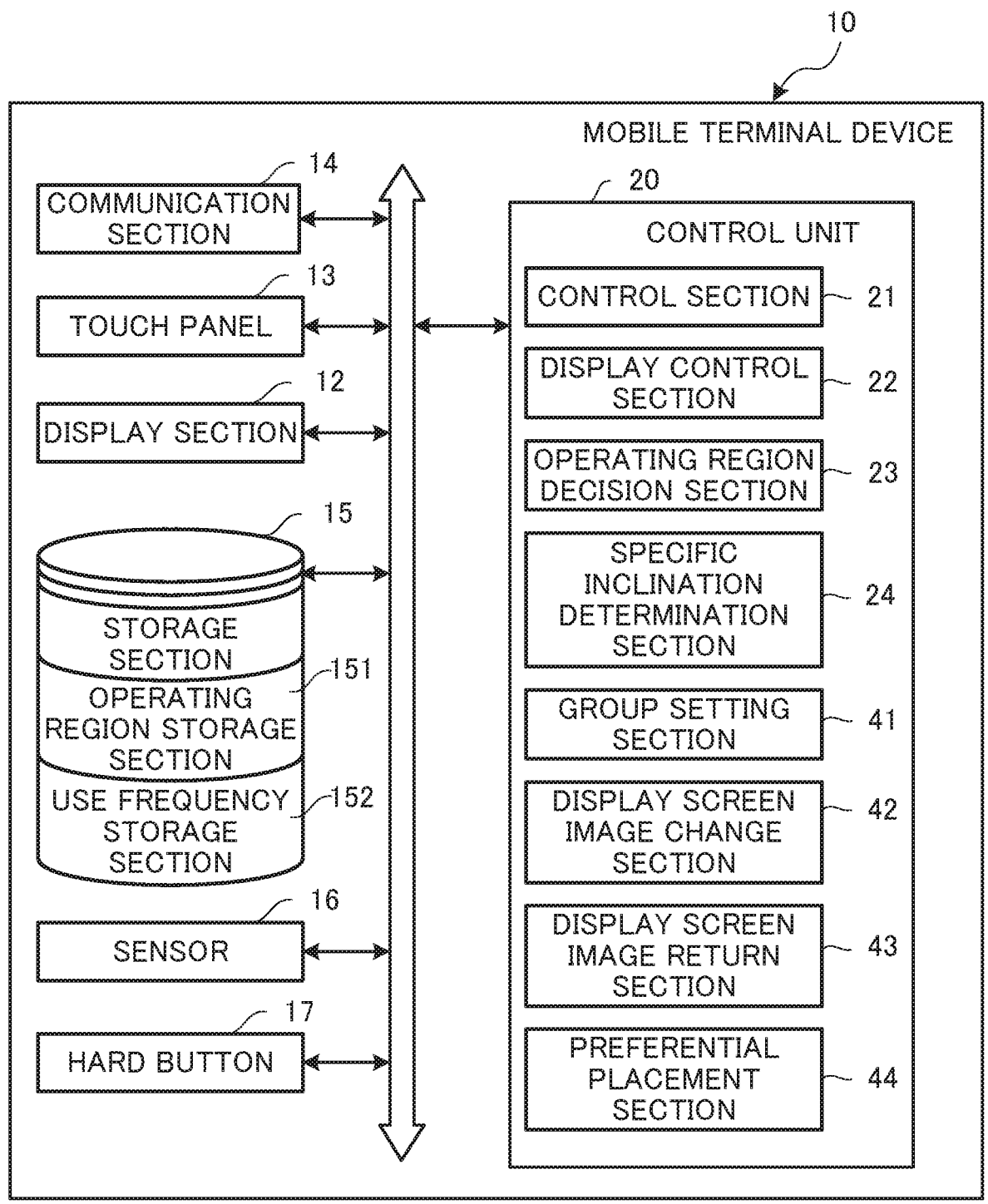
FIG. 15 is a block diagram showing the configuration of a mobile terminal device according to a third embodiment of the present disclosure.
Figure 16:
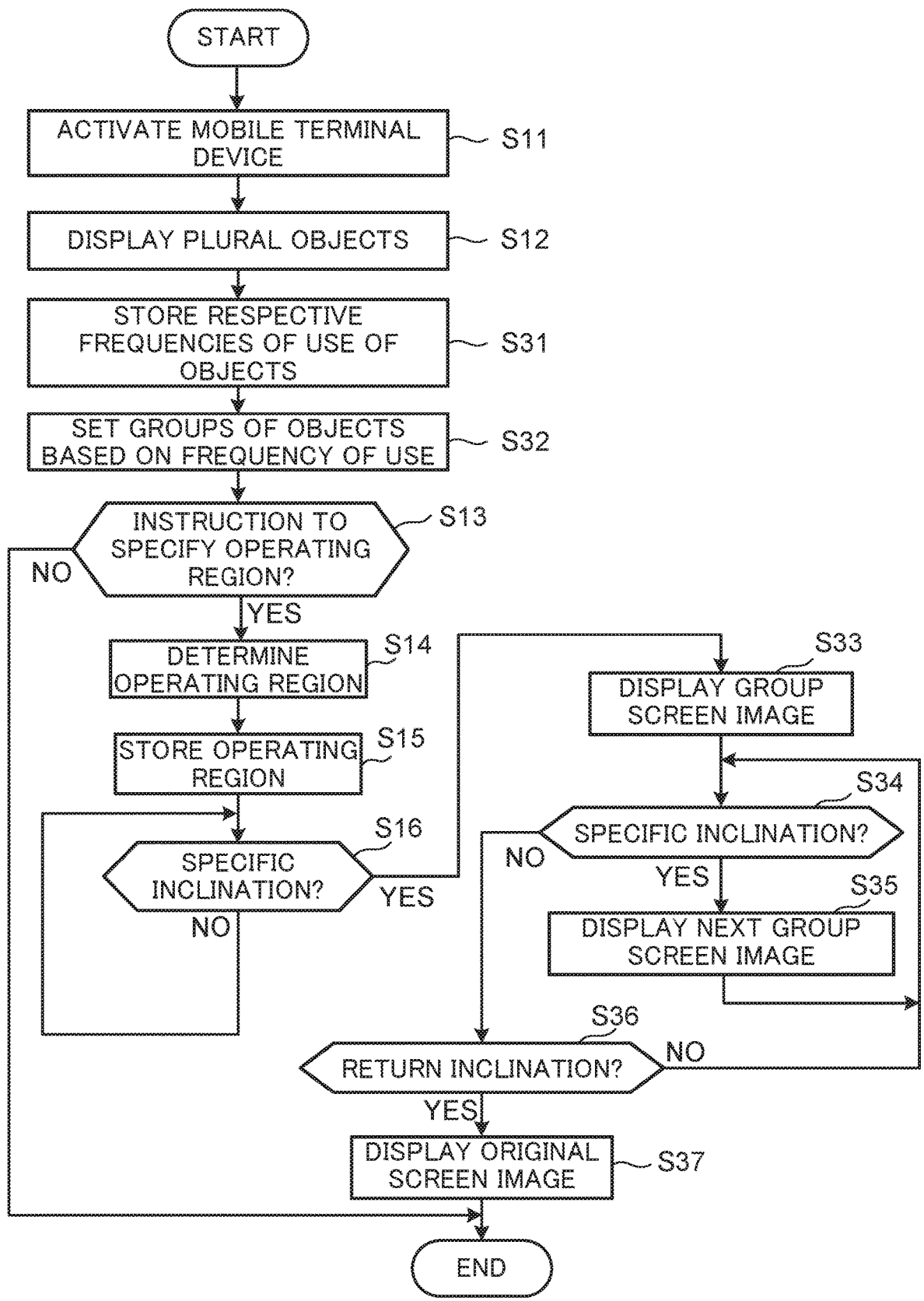
FIG. 16 is a flowchart showing an example of object movement and display processing in the third embodiment.

Next, a description will be given of a mobile terminal device 10 according to a third embodiment with reference to FIGS. 15 to 17. FIG. 15 is a block diagram showing the configuration of the mobile terminal device 10 according to the third embodiment. Among the components shown in FIG. 15, the same components as those shown in FIG. 2 related to the above-described first embodiment are designated by the same references and further explanation thereof will be omitted.

The control unit 20 shown in FIG. 15 includes a group setting section 41, a display screen image change section 42, a display screen image return section 43, and a preferential placement section 44.

The group setting section 41 sets, using the respective frequencies of use of the plurality of objects stored in the use frequency storage section 152, a plurality of groups for the plurality of objects by ranking the plurality of objects in descending order of the frequency of use and separating the ranked objects every predetermined number of objects starting from the highest order object. For example, the predetermined number of (for example, four) objects belonging to a first group having the highest frequency of use are, in an example shown in FIG. 17B, four objects OJ "A", "B", "M", and "H". The predetermined number of (for example, four) objects belonging to a second group having the next highest frequency of use are, in an example shown in FIG. 17C, four objects OJ "E", "F", "I", and "J". The predetermined number of (for example, four) objects belonging to a third group having the third highest frequency of use are, in an example shown in FIG. 17D, four objects OJ "C", "D", "G", and "N".

Figure 17A:
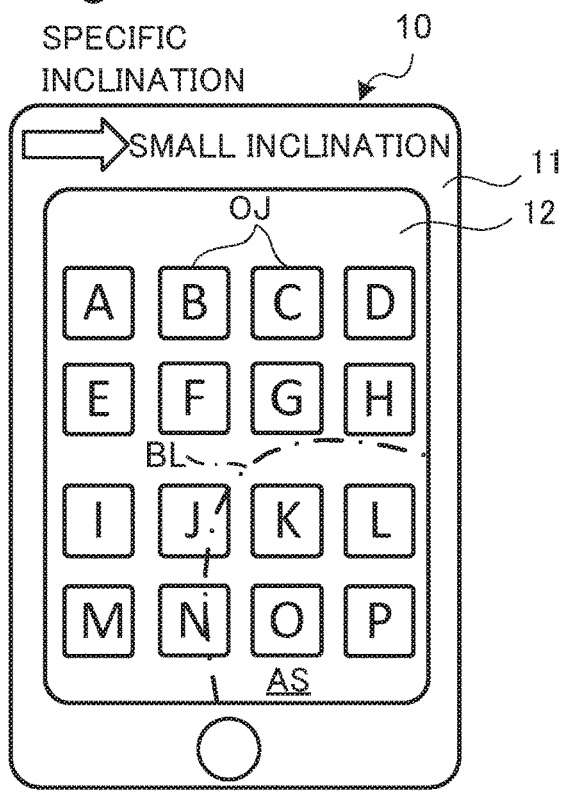
FIGS. 17A to 17D are views showing examples of display screen images in the cases of moving and displaying objects within the operating region in the third embodiment.
Figure 17B:
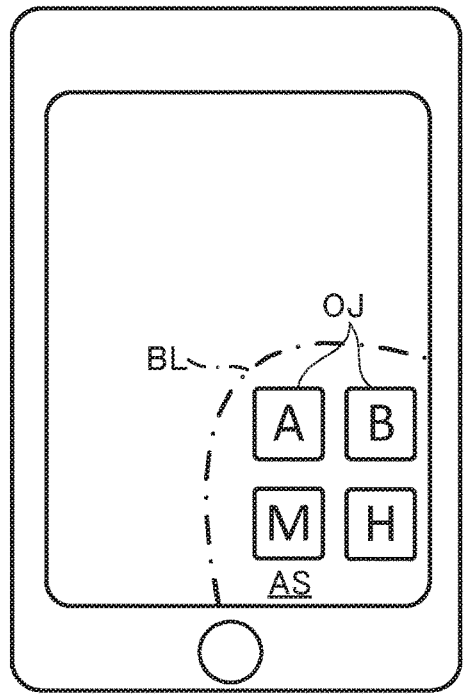

When the detected inclination of the housing 11 is determined to be a specific inclination by the specific inclination determination section 24 as shown in FIG. 17A, the display screen image change section 42 changes the display on the screen of the display section 12, as shown in FIG. 17B, to a first group screen image as a group screen image which is a next screen image, thus displaying, within the operating region AS of the first group screen image, the predetermined number of objects (four objects OJ "A, "B", "M", and "H" in the example of FIG. 17B) belonging to the first group set by the group setting section 41 and having the highest frequency of use. Thus, the first group screen image, which has been obtained by dividing the objects out of the operating region AS into groups according to the frequency of use and moving objects belonging to the first group having the highest frequency of use into the operating region AS, can be displayed as a next screen image and, thus, the user can be made aware that the screen image being displayed is a group screen image different from the normal screen image.

Figure 17C:
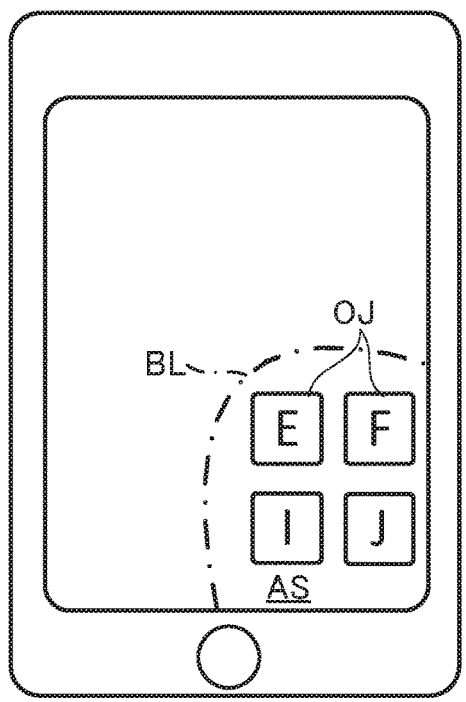

When, during display of the first group screen image shown in FIG. 17B, the detected inclination of the housing 11 is determined to be a specific inclination by the specific inclination determination section 24, the display screen image change section 42 changes the display on the screen of the display section 12 from the first group screen image to a second group screen image which is a next screen image shown in FIG. 17C, thus displaying, within the operating region AS of the second group screen image, the predetermined number of objects (four objects OJ "E, "F", "I", and "J" in the example of FIG. 17C) belonging to the second group set by the group setting section 41 and having the highest frequency of use next to the first group. Thus, the second group screen image, which has been obtained by moving objects belonging to the second group having the next highest frequency of use into the operating region AS, can be displayed as a next screen image and, thus, the user can also select the objects in the second group with the operating finger U.

Figure 17D:
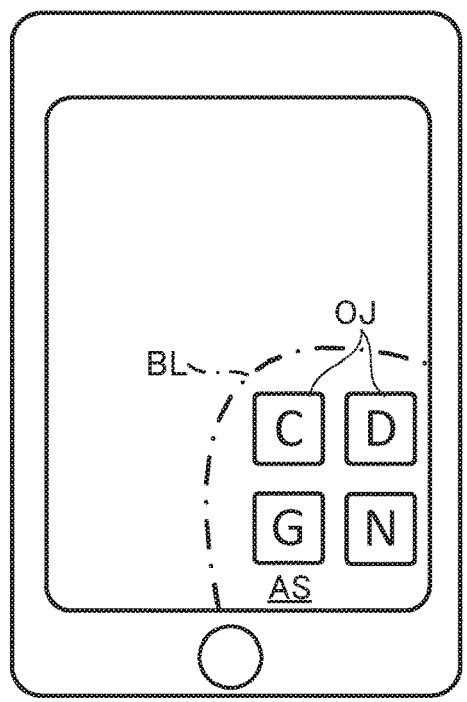

When, during display of one of the group screen images shown in FIGS. 17B to 17D by the display screen image change section 42, the inclination of the housing 11 detected by the sensor 16 is determined to be a return inclination toward the opposite side to the operating finger U of the right hand by the specific inclination determination section 24, the display screen image return section 43 returns the display on the screen of the display section 12 from one of the group screen images shown in FIGS. 17B to 17D to the original screen image in which the plurality of objects are displayed at the plurality of predetermined placement locations, respectively, as shown in FIG. 17A. Thus, the user can return the display on the screen from the group screen image to the original screen image simply by performing a return inclination of the housing 11, i.e., simply by making a single return inclination gesture. Each time a determination of a return inclination is made, the display screen image return section 43 may return the display on the screen of the display section 12 one screen image after the other in the following order: FIG. 17D, FIG. 17C, FIG. 17B, and FIG. 17A.

The display screen image change section 42 may allow an information display indicating information on each of the group screen images shown in FIGS. 17B to 17D to be displayed on the screen of the display section 12. Examples of the information display indicating information on the first group screen image shown in FIG. 17B include "Highest Frequency-of-Use Group" and "First Group". Examples of the information display indicating information on the second group screen image shown in FIG. 17C include "Second Highest Frequency-of-Use Group" and "Second Group".

Thus, when looking at the information on the group screen image, the user can know which group screen image is being displayed and can be made more aware that the screen image being displayed is a group screen image.

The preferential placement section 44 preferentially places objects having higher frequencies of use at locations along the trace of points of touch in the operating region AS of each group screen image. For example, if four objects OJ "B", "A", "M", and "H" shown in FIG. 17B have higher frequencies of use in this order (i.e., in the case where the order of frequency of use is "B">"A">"M">"H"), three objects OJ "B", "A", and "M" are placed along the boundary line BL as shown in FIG. 17B and the remaining object OJ "H" is placed away from the boundary line BL. The locations in the vicinity of the boundary line BL are locations which the user can touch with the operating finger U without bending the first joint or the second joint, and are therefore locations where the user can most easily make gestures with the operating finger U. Hence, preferential placement of objects having higher frequencies of use at these locations provides further increased operability.

Next, a description will be given of object movement and display processing in the mobile terminal device 10 according to the third embodiment, with reference to the flowchart shown in FIG. 16. FIG. 16 is a flowchart showing an example of the object movement and display processing in the third embodiment. The processing steps S11 to S16 are the same as in the first embodiment shown in FIG. 4 and, therefore, the processing step S31 and later processing steps will be described below.

After the step S12, the control section 21 allows the use frequency storage section 152 to store the respective frequencies of use of the plurality of objects (S31: frequency-of-use storage step). For example, the control section 21 allows the use frequency storage section 152 to store the number of accumulated touch gestures (the frequency of use) on each object for the past predetermined number of days.

The group setting section 41 sets, using the respective frequencies of use of the plurality of objects stored in the use frequency storage section 152, a plurality of groups for the plurality of objects by ranking the plurality of objects in descending order of the frequency of use and separating the ranked objects every predetermined number of objects starting from the highest order object (S32: group setting step).

When the detected inclination of the housing 11 is determined to be a specific inclination by the specific inclination determination section 24 (YES in S16), the display screen image change section 42 changes the display on the screen of the display section 12, as shown in FIG. 17B, to the first group screen image as the group screen image which is a next screen image, thus displaying, within the operating region AS of the first group screen image, the predetermined number of objects (four objects OJ "A", "B", "M", and "H" in the example of FIG. 17B) belonging to the first group set by the group setting section 41 and having the highest frequency of use (S33: display screen image change step).

Then, when the detected inclination of the housing 11 is determined to be a specific inclination by the specific inclination determination section 24 (YES in S34), the display screen image change section 42 changes the display on the screen of the display section 12 from the first group screen image to the second group screen image which is a next screen image shown in FIG. 17C, thus displaying, within the operating region AS of the second group screen image, the predetermined number of objects (four objects OJ "E, "F", "I", and "J" in the example of FIG. 17C) belonging to the second group set by the group setting section 41 and having the highest frequency of use next to the first group (S35). After the step S35, the processing goes back to S34.

On the other hand, when the detected inclination of the housing 11 is determined not to be a specific inclination by the specific inclination determination section 24 (NO in S34), the specific inclination determination section 24 determines, during display of one of the group screen images shown in FIGS. 17B to 17D, whether or not the inclination of the housing 11 detected by the sensor 16 is a return inclination toward the opposite side to the operating finger U of the right hand (S36). When the inclination of the housing 11 is determined to be a return inclination by the specific inclination determination section 24 (YES in S36), the display screen image return section 43 returns the display on the screen of the display section 12 from one of the group screen images shown in FIGS. 17B to 17D to the original screen image in which the plurality of objects are displayed at the plurality of predetermined placement locations, respectively, as shown in FIG. 17A (S37).

When the control section 21 determines that there is no instruction to specify the operating region AS (NO in S13) or after the processing step S37, the control section 21 ends this processing.

As thus far described, according to the third embodiment, the operability of the mobile terminal device 10 with one hand can be improved, like the above-described first embodiment. Furthermore, the first group screen image, which has been obtained by dividing the objects out of the operating region AS into groups according to the frequency of use and moving objects belonging to the first group having the highest frequency of use into the operating region AS, can be displayed as a next screen image and, thus, the user can be made aware that the screen image being displayed is a group screen image different from the normal screen image.

Although in the above embodiments the mobile terminal device 10 has been described by taking as an example a smartphone having a cellular phone function, the mobile terminal device according to the present disclosure is not limited to such a smartphone. The mobile terminal device need only be an electronic device that includes a touch panel-equipped display section and is required to be operated with one hand, and may be, for example, a gaming device, a tablet-size personal computer, a notebook-size personal computer, an electronic dictionary, an e-book reader or the like.

The structures and processing described in the above embodiments and modifications with reference to FIGS. 1 to 17D are merely illustrative of the present disclosure and the present disclosure is not intended to be limited to the above structures and processing. Furthermore, the structures shown in the above embodiments and the structures shown in the above modification may be combined variously.

While the present disclosure has been described in detail with reference to the embodiments thereof, it would be apparent to those skilled in the art the various changes and modifications may be made therein within the scope defined by the appended claims.

What is claimed is:
1. A mobile terminal device comprising:
a housing;
a display section housed in the housing;
a touch panel disposed on a screen of the display section;
a sensor that detects an inclination of the housing; and a control unit that comprises a processor and, upon execution of a control program by the processor, functions as:
a display control section that allows the display section to display, at a plurality of predetermined placement locations on the screen, a plurality of objects selectable by a user's touch gesture;
an operating region decision section that, during holding of the housing with a user's one hand, determines an operating region on the screen of the display section reachable with an operating finger of the one hand from a trace of points of touch on the screen of the display section with the operating finger;
an operating region storage section that stores region data indicating the operating region determined by the operating region decision section;
a specific inclination determination section that, after storage of the region data in the operating region storage section, determines whether or not the inclination of the housing detected by the sensor is a specific inclination toward the operating finger of the one hand; and
a display change section that, upon determination of the specific inclination by the specific inclination determination section, sets a plurality of changed placement locations within the operating region, moves the plurality of objects to the set plurality of changed placement locations, respectively, and displays the plurality of objects at the plurality of changed placement locations, respectively,
wherein the control unit further functions as a determination section that determines whether or not at least one of the plurality of predetermined placement locations is contained within the operating region determined by the operating region decision section,
wherein when the determination section determines that none of the plurality of predetermined placement locations for the plurality of objects is contained within the operating region and the detected inclination of the housing is determined to be the specific inclination by the specific inclination determination section, the display change section moves the plurality of objects to the plurality of changed placement locations, respectively, within the operating region indicated by the region data stored in the operating region storage section, and displays the plurality of objects at the plurality of changed placement locations, respectively,
wherein when the determination section determines that the at least one predetermined placement location is contained within the operating region and the detected inclination of the housing is determined to be the specific inclination by the specific inclination determination section, the display change section replaces the object located at the at least one predetermined placement location with the object located out of the operating region and displays the plurality of objects in reflection of the replacement of the objects,
wherein when the determination section determines that one or some of the plurality of objects are placed within the operating region and the detected inclination of the housing is determined to be the specific inclination by the specific inclination determination section, the display change section replaces the one or some objects within the operating region with, among the remaining objects out of the operating region, one or some objects within a predetermined area located upstream in a direction of the specific inclination and displays the plurality of objects in reflection of the replacement of the objects,
wherein the control unit further functions as:
a use frequency storage section that stores respective frequencies of use of the plurality of objects; and
a first specifying section that, using the respective frequencies of use of the plurality of objects stored in the use frequency storage section, specifies, among the one or some objects within the operating region, an object having the lowest frequency of use and specifies, among the objects out of the operating region and within the predetermined area located upstream in the direction of the specific inclination, an object having the highest frequency of use, and
wherein when the determination section determines that one or some of the plurality of objects are placed within the operating region and the detected inclination of the housing is determined to be the specific inclination by the specific inclination determination section, the display change section replaces the object having the lowest frequency of use with the object having the highest frequency of use and displays the plurality of objects in reflection of the replacement of the objects.

2. A mobile terminal device comprising:
a housing;
a display section housed in the housing;
a touch panel disposed on a screen of the display section;
a sensor that detects an inclination of the housing; and
a control unit that comprises a processor and, upon execution of a control program by the processor, functions as:
a display control section that allows the display section to display, at a plurality of predetermined placement locations on the screen, a plurality of objects selectable by a user's touch gesture;
an operating region decision section that, during holding of the housing with a user's one hand, determines an operating region on the screen of the display section reachable with an operating finger of the one hand from a trace of points of touch on the screen of the display section with the operating finger;
an operating region storage section that stores region data indicating the operating region determined by the operating region decision section;
a specific inclination determination section that, after storage of the region data in the operating region storage section, determines whether or not the inclination of the housing detected by the sensor is a specific inclination toward the operating finger of the one hand; and
a display change section that, upon determination of the specific inclination by the specific inclination determination section, sets a plurality of changed placement locations within the operating region, moves the plurality of objects to the set plurality of changed placement locations, respectively, and displays the plurality of objects at the plurality of changed placement locations, respectively,
wherein the control unit further functions as:
a determination section that determines whether or not at least one of the plurality of predetermined placement locations is contained within the operating region determined by the operating region decision section;
a blank region forming section that forms a blank region within the operating region when the detected inclination of the housing is determined to be the specific inclination by the specific inclination determination section and the determination section determines that the at least one predetermined placement location is contained within the operating region; and a leading line display control section that allows display of a plurality of leading lines running from all the objects out of the operating region toward the blank region, wherein when the touch panel detects a gesture of moving one of the plurality of leading lines toward the blank region with the operating finger of the one hand being touched to the one leading line, the display change section moves the object connected to the one leading line into the blank region and displays the object within the blank region, wherein the control unit further functions as:

a use frequency storage section that stores respective frequencies of use of the plurality of objects; and a numerical determination section that, using the respective frequencies of use of the plurality of objects stored in the use frequency storage section, determines whether or not the frequency of use of each of the objects connected to the leading lines is equal to or more than a predetermined value, wherein when the numerical determination section determines that the frequency of use of the object connected to the leading line is equal to or more than the predetermined value, the leading line display control section allows display of the leading line in a first display manner, and wherein when the numerical determination section determines that the frequency of use of the object connected to the leading line is less than the predetermined value, the leading line display control section allows display of the leading line in a second display manner different from the first display manner.

3. The mobile terminal device according to claim 2, wherein the control unit further functions as an individual return section that, when the display change section moves and displays the object connected to the one leading line within the blank region and the touch panel detects a touch gesture of cutting across the one leading line with the operating finger of the one hand, returns the object having been moved and displayed within the blank region to an original placement location out of the operating region and displays the object at the original placement location.

4. A mobile terminal device comprising:

a housing;

a display section housed in the housing;

a touch panel disposed on a screen of the display section;

a sensor that detects an inclination of the housing; and a control unit that comprises a processor and, upon execution of a control program by the processor, functions as:

a display control section that allows the display section to display, at a plurality of predetermined placement locations on the screen, a plurality of objects selectable by a user's touch gesture;

an operating region decision section that, during holding of the housing with a user's one hand, determines an operating region on the screen of the display section reachable with an operating finger of the one hand from a trace of points of touch on the screen of the display section with the operating finger;

an operating region storage section that stores region data indicating the operating region determined by the operating region decision section;

a specific inclination determination section that, after storage of the region data in the operating region storage section, determines whether or not the inclination of the housing detected by the sensor is a specific inclination toward the operating finger of the one hand; and a display change section that, upon determination of the specific inclination by the specific inclination determination section, sets a plurality of changed placement locations within the operating region, moves the plurality of objects to the set plurality of changed placement locations, respectively, and displays the plurality of objects at the plurality of changed placement locations, respectively, wherein the control unit further functions as:

a determination section that determines whether or not at least one of the plurality of predetermined placement locations is contained within the operating region determined by the operating region decision section;

a blank region forming section that forms a blank region within the operating region when the detected inclination of the housing is determined to be the specific inclination by the specific inclination determination section and the determination section determines that the at least one predetermined placement location is contained within the operating region; and a leading line display control section that allows display of a plurality of leading lines running from all the objects out of the operating region toward the blank region, wherein when the touch panel detects a gesture of moving one of the plurality of leading lines toward the blank region with the operating finger of the one hand being touched to the one leading line, the display change section moves the object connected to the one leading line into the blank region and displays the object within the blank region, wherein the control unit further functions as:

a use frequency storage section that stores respective frequencies of use of the plurality of objects; and a second specifying section that, using the respective frequencies of use of the plurality of objects stored in the use frequency storage section, specifies, among the objects within the operating region, an object having the lowest frequency of use, and wherein when the object connected to the one leading line is moved into the blank region, the leading line display control section allows display of the one leading line in a third display manner and allows display of the leading line for the object specified to have the lowest frequency of use within the operating region by the second specifying section in a fourth display manner different from the third display manner.

5. The mobile terminal device according to claim 4, wherein the control unit further functions as an irregular movement section that, when the touch panel detects a touch gesture of cutting across the one leading line with the operating finger of the one hand, the one leading line being allowed to be displayed in the third manner by the leading line display control section, moves, instead of the object connected to the leading line displayed in the third display manner, the object having the lowest frequency of use within the operating region and connected to the leading line displayed in the fourth display manner to one of the placement locations out of the operating region and displays the object having the lowest frequency of use at the one placement location.

\* \* \* \* \*